US012062379B2

(12) United States Patent
Xia et al.

(10) Patent No.: US 12,062,379 B2
(45) Date of Patent: Aug. 13, 2024

(54) AUDIO CODING OF TONAL COMPONENTS WITH A SPECTRUM RESERVATION FLAG

(71) Applicant: Huawei Technologies Co., Ltd., Shenzhen (CN)

(72) Inventors: Bingyin Xia, Beijing (CN); Jiawei Li, Beijing (CN); Zhe Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 8 days.

(21) Appl. No.: 18/072,038

(22) Filed: Nov. 30, 2022

(65) Prior Publication Data

US 2023/0137053 A1 May 4, 2023

Related U.S. Application Data

(63) Continuation of application No. PCT/CN2021/096688, filed on May 28, 2021.

(30) Foreign Application Priority Data

May 30, 2020 (CN) ........................ 202010480925.6

(51) Int. Cl.
*G10L 19/02* (2013.01)
*G10L 21/038* (2013.01)
*G10L 21/0388* (2013.01)

(52) U.S. Cl.
CPC .................................... *G10L 19/02* (2013.01)

(58) Field of Classification Search
CPC . G10L 19/02; G10L 19/0204; G10L 19/0208; G10L 19/028; G10L 21/038; G10L 21/0388

(Continued)

(56) References Cited

U.S. PATENT DOCUMENTS 10,224,048 B2 3/2019 Kamano et al.
2003/0171917 A1* 9/2003 Zhu ........................ G10L 25/90 704/207

(Continued)

FOREIGN PATENT DOCUMENTS

CN 1539136 A 10/2004
CN 1831940 A 9/2006

(Continued)

OTHER PUBLICATIONS

Takamizawa et al. "An Efficient Tonal Component Coding Algorithm for MPEG-2 Audio NBC", 1997 IEEE International Conference on Acoustics, Speech, and Signal Processing, Apr. 21-24, 1997, pp. 331 to 334. (Year: 1997).*

(Continued)

*Primary Examiner* — Martin Lerner
(74) *Attorney, Agent, or Firm* — Conley Rose, P.C.

(57) ABSTRACT

An audio coding method includes obtaining a current frame that includes a high-frequency band signal and a low-frequency band signal; performing first coding on the high-frequency band signal and the low-frequency band signal to obtain a first coding parameter; determining a spectrum reservation flag of each frequency bin of the high-frequency band signal, where the spectrum reservation flag indicates whether a first spectrum corresponding to the frequency bin is reserved in a second spectrum corresponding to the frequency bin; and performing second coding on the high-frequency band signal based on the spectrum reservation flag of each frequency bin of the high-frequency band signal to obtain a second coding parameter, where the second coding parameter indicates information about a target tonal component of the high-frequency band signal.

20 Claims, 6 Drawing Sheets

(58) Field of Classification Search
USPC .................................. 704/205, 206, 500, 501
See application file for complete search history.

(56) References Cited

U.S. PATENT DOCUMENTS

| | | | |
|---|---|---|---|
| 2004/0225493 A1 | 11/2004 | Jung et al. | |
| 2007/0238415 A1* | 10/2007 | Sinha | G10L 21/038 455/66.1 |
| 2008/0052066 A1 | 2/2008 | Oshikiri et al. | |
| 2008/0270125 A1 | 10/2008 | Choo et al. | |
| 2009/0006103 A1 | 1/2009 | Koishida et al. | |
| 2009/0177466 A1* | 7/2009 | Rui | G10L 21/0208 704/225 |
| 2010/0280833 A1* | 11/2010 | Yamanashi | G10L 21/038 704/500 |
| 2013/0290003 A1* | 10/2013 | Choo | G10L 19/02 704/500 |
| 2014/0343932 A1* | 11/2014 | Daimou | G10L 19/26 704/205 |
| 2015/0162010 A1 | 6/2015 | Ishikawa et al. | |
| 2015/0317997 A1* | 11/2015 | Herberger | G10L 21/0208 386/285 |
| 2015/0332701 A1 | 11/2015 | Nagel et al. | |
| 2016/0042742 A1 | 2/2016 | Kjoerling et al. | |
| 2016/0140979 A1 | 5/2016 | Disch et al. | |
| 2017/0069332 A1 | 3/2017 | Disch et al. | |
| 2019/0035413 A1 | 1/2019 | Suzuki et al. | |
| 2019/0189137 A1 | 6/2019 | Disch et al. | |
| 2022/0343926 A1* | 10/2022 | Xia | G10L 19/0208 |
| 2022/0343927 A1* | 10/2022 | Xia | G10L 19/02 |
| 2022/0358941 A1* | 11/2022 | Xia | G10L 19/0204 |
| 2023/0040515 A1* | 2/2023 | Xia | G10L 21/038 |

FOREIGN PATENT DOCUMENTS

| | | | | |
|---|---|---|---|---|
| CN | 101950562 A | 1/2011 | | |
| CN | 102194458 A | 9/2011 | | |
| CN | 102201242 A | 9/2011 | | |
| CN | 102750954 A | 10/2012 | | |
| CN | 104584124 A | 4/2015 | | |
| CN | 105580075 A | 5/2016 | | |
| CN | 109346101 A | 2/2019 | | |
| CN | 109863556 A | 6/2019 | | |
| EP | 2881943 A1 * | 6/2015 | | G10L 19/008 |
| EP | 3010018 A1 * | 4/2016 | | G10L 19/02 |
| EP | 4152318 A1 | 3/2023 | | |
| WO | WO-2019148112 A1 * | 8/2019 | | G10L 19/02 |
| WO | WO-2019210068 A1 * | 10/2019 | | G10L 19/167 |

OTHER PUBLICATIONS

Samaali et al. "High-Frequency Tonal Components Restoration in Low-Bitrate Audio Coding Using Multiple Spectral Translations", 2015 23rd European Signal Processing Conference (EUSIPCO), Aug. 31 to Sep. 4, 2015, 5 Pages. (Year: 2015).*

Zernicki et al. "improved Coding of Tonal Components in MPEG-4 AAC With SBR", 16th European Signal Processing Confernece (EUSIPCO), Aug. 25-28, 2008, 5 Pages. (Year: 2008).*

* cited by examiner

AUDIO CODING OF TONAL COMPONENTS WITH A SPECTRUM RESERVATION FLAG

CROSS-REFERENCE TO RELATED APPLICATIONS

This application is a continuation application of International Patent Application No. PCT/CN2021/096688 filed on May 28, 2021, which claims priority to Chinese Patent Application No. 202010480925.6 filed on May 30, 2020. The disclosures of the aforementioned applications are hereby incorporated by reference in their entireties.

TECHNICAL FIELD

This application relates to the field of audio signal coding technologies, and in particular, to an audio coding method and apparatus.

BACKGROUND

As quality of life improves, people have an increasing demand on high-quality audio. To better transmit an audio signal over limited bandwidth, the audio signal is encoded first, and then an encoded bitstream is transmitted to a decoder side. The decoder side performs decoding processing on the received bitstream to obtain a decoded audio signal, where the decoded audio signal is for playback.

How to improve audio signal coding efficiency becomes a technical problem that urgently needs to be resolved.

SUMMARY

Embodiments of this application provide an audio coding method and apparatus, to improve audio signal coding efficiency.

To resolve the foregoing technical problem, embodiments of this application provide the following technical solutions.

According to a first aspect, an embodiment of this application provides an audio coding method, including obtaining a current frame of an audio signal, where the current frame includes a high-frequency band signal and a low-frequency band signal, performing first coding on the high-frequency band signal and the low-frequency band signal, to obtain a first coding parameter of the current frame, where first coding includes bandwidth extension coding, determining a spectrum reservation flag of each frequency bin of the high-frequency band signal, where the spectrum reservation flag indicates whether a first spectrum corresponding to the frequency bin is reserved in a second spectrum corresponding to the frequency bin, the first spectrum includes a spectrum corresponding to the frequency bin before bandwidth extension coding, and the second spectrum includes a spectrum corresponding to the frequency bin after bandwidth extension coding, performing second coding on the high-frequency band signal based on the spectrum reservation flag of each frequency bin of the high-frequency band signal, to obtain a second coding parameter of the current frame, where the second coding parameter indicates information about a target tonal component of the high-frequency band signal, and the information about the tonal component includes location information, quantity information, and amplitude information or energy information of the tonal component, and performing bitstream multiplexing on the first coding parameter and the second coding parameter, to obtain a coded bitstream. In this embodiment of this application, a process of first coding includes bandwidth extension coding. The spectrum reservation flag of each frequency bin of the high-frequency band signal may be determined based on spectrums of the high-frequency band signal before and after bandwidth extension coding. Whether a spectrum of a frequency bin of the high-frequency band signal before bandwidth extension coding is reserved after bandwidth extension coding is indicated by using the spectrum reservation flag. Second coding is performed on the high-frequency band signal based on the spectrum reservation flag of each frequency bin of the high-frequency band signal, and the spectrum reservation flag of each frequency bin of the high-frequency band signal may be used to avoid repeated coding of a tonal component already reserved in bandwidth extension coding. This can improve tonal component coding efficiency.

In a possible implementation, determining a spectrum reservation flag of each frequency bin of the high-frequency band signal includes determining the spectrum reservation flag of each frequency bin of the high-frequency band signal based on the first spectrum, the second spectrum, and a frequency range of bandwidth extension coding. In the foregoing solution, in a process of bandwidth extension coding, a signal spectrum (that is, the first spectrum) before bandwidth extension coding, a signal spectrum (that is, the second spectrum) after bandwidth extension coding, and the frequency range of bandwidth extension coding may be obtained. The frequency range of bandwidth extension coding may be a frequency bin range of bandwidth extension coding. For example, the frequency range of bandwidth extension coding includes a start frequency bin and an end frequency bin for intelligent gap filling (IGF) processing. Alternatively, the frequency range of bandwidth extension coding may be represented in another manner. For example, the frequency range of bandwidth extension coding is represented based on a start frequency value and an end frequency value of bandwidth extension coding.

In a possible implementation, a high-frequency band corresponding to the high-frequency band signal includes at least one frequency area, and the at least one frequency area includes a current frequency area. Performing second coding on the high-frequency band signal based on the spectrum reservation flag of each frequency bin of the high-frequency band signal, to obtain a second coding parameter of the current frame includes performing peak search based on a high-frequency band signal of the current frequency area, to obtain information about a peak in the current frequency area, where the information about the peak in the current frequency area includes quantity information of the peak, location information of the peak, and amplitude information of the peak or energy information of the peak in the current frequency area, performing peak screening on the information about the peak in the current frequency area based on the spectrum reservation flag of each frequency bin in the current frequency area, to obtain information about a candidate tonal component of the current frequency area, obtaining information about a target tonal component of the current frequency area based on the information about the candidate tonal component of the current frequency area, and obtaining the second coding parameter of the current frequency area based on the information about the target tonal component of the current frequency area. In the foregoing solution, peak screening is performed on the information about the peak in the current frequency area based on the spectrum reservation flag of each frequency bin in the current frequency area, to obtain the information about the candidate tonal component of the current frequency area. The spectrum reservation flag of each frequency bin of the high-frequency band signal may be used to avoid repeated coding of a tonal component already reserved in bandwidth extension coding. This can improve tonal component coding efficiency.

In a possible implementation, the high-frequency band corresponding to the high-frequency band signal includes at least one frequency area, and the at least one frequency area includes the current frequency area. When a first frequency bin in the current frequency area does not belong to the frequency range of bandwidth extension coding, a value of a spectrum reservation flag of the first frequency bin is a first preset value. Alternatively, when a second frequency bin in the current frequency area belongs to the frequency range of bandwidth extension coding, a value of a spectrum reservation flag of the second frequency bin is a second preset value if a spectrum value corresponding to the second frequency bin before bandwidth extension coding and a spectrum value corresponding to the second frequency bin after bandwidth extension coding meet a preset condition, or the value of the spectrum reservation flag of the second frequency bin is a third preset value if the spectrum value corresponding to the second frequency bin before bandwidth extension coding and the spectrum value corresponding to the second frequency bin after bandwidth extension coding do not meet the preset condition. Further, an audio coding apparatus first determines whether one or more frequency bins in the current frequency area belong to the frequency range of bandwidth extension coding. For example, the first frequency bin is defined as a frequency bin that is in the current frequency area and that does not belong to the frequency range of bandwidth extension coding, and the second frequency bin is defined as a frequency bin that is in the current frequency area and that belongs to the frequency range of bandwidth extension coding. The value of the spectrum reservation flag of the first frequency bin is the first preset value, and the spectrum reservation flag of the second frequency bin has two values, for example, the second preset value and the third preset value respectively. Further, when the spectrum value corresponding to the second frequency bin before bandwidth extension coding and the spectrum value corresponding to the second frequency bin after bandwidth extension coding meet the preset condition, the value of the spectrum reservation flag of the second frequency bin is the second preset value. When the spectrum value corresponding to the second frequency bin before bandwidth extension coding and the spectrum value corresponding to the second frequency bin after bandwidth extension coding do not meet the preset condition, the value of the spectrum reservation flag of the second frequency bin is the third preset value. The preset condition may be implemented in a plurality of manners. This is not limited herein. For example, the preset condition is a condition specified for a spectrum value before bandwidth extension coding and a spectrum value after bandwidth extension coding, which may be determined based on an application scenario.

In a possible implementation, the current frequency area includes at least one subband, and the performing peak screening on the information about the peak in the current frequency area based on the spectrum reservation flag of each frequency bin in the current frequency area, to obtain information about a candidate tonal component of the current frequency area includes obtaining a spectrum reservation flag of each subband of the current frequency area based on the spectrum reservation flag of each frequency bin in the current frequency area, and performing peak screening on the information about the peak in the current frequency area based on the spectrum reservation flag of each subband of the current frequency area, to obtain the information about the candidate tonal component of the current frequency area. In this embodiment of this application, the spectrum reservation flag of each subband of the current frequency area may be used to avoid repeated coding of a tonal component already reserved in bandwidth extension coding. This can improve tonal component coding efficiency.

In a possible implementation, the at least one subband includes a current subband, and the obtaining a spectrum reservation flag of each subband of the current frequency area based on the spectrum reservation flag of each frequency bin in the current frequency area includes, if a quantity of frequency bins that are in the current subband and whose values of spectrum reservation flags are equal to the second preset value is greater than a preset threshold, determining that a value of a spectrum reservation flag of the current subband is a first flag value, where if a spectrum value corresponding to a frequency bin before bandwidth extension coding and a spectrum value corresponding to the frequency bin after bandwidth extension coding meet a preset condition, a value of a spectrum reservation flag of the frequency bin is the second preset value, or if the quantity of frequency bins that are in the current subband and whose values of spectrum reservation flags are equal to the second preset value is less than or equal to the preset threshold, determining that the value of the spectrum reservation flag of the current subband is a second flag value. The first flag value indicates that the quantity of frequency bins that are in the current subband and whose values of spectrum reservation flags are equal to the second preset value is greater than the preset threshold. If the spectrum value corresponding to the frequency bin before bandwidth extension coding and the spectrum value corresponding to the frequency bin after bandwidth extension coding meet the preset condition, the value of the spectrum reservation flag of the frequency bin is the second preset value, and the frequency bin is the frequency bin in the current subband. The second flag value indicates that the quantity of frequency bins that are in the current subband and whose values of spectrum reservation flags are equal to the second preset value is less than or equal to the preset threshold. The spectrum reservation flag of the current subband may have a plurality of values. For example, the spectrum reservation flag of the current subband is the first flag value, or the spectrum reservation flag of the current subband is the second flag value, which may be further determined based on the quantity of frequency bins that are in the current subband and whose values of spectrum reservation flags are equal to the second preset value.

In a possible implementation, performing peak screening on the information about the peak in the current frequency area based on the spectrum reservation flag of each subband of the current frequency area, to obtain the information about the candidate tonal component of the current frequency area includes obtaining, based on the location information of the peak in the current frequency area, a subband sequence number corresponding to a location of the peak in the current frequency area, and performing peak screening on the information about the peak in the current frequency area based on the subband sequence number corresponding to the location of the peak in the current frequency area and the spectrum reservation flag of each subband of the current frequency area, to obtain the information about the candidate tonal component of the current frequency area. Peak screening is performed on the information about the peak in the current frequency area based on the subband sequence number corresponding to the location of the peak in the current frequency area and the spectrum reservation flag of each subband of the current frequency area, to obtain screened quantity information of the peak, location information of the peak, and amplitude information or energy information of the peak in the current frequency area as the information about the candidate tonal component of the current frequency area. In this embodiment of this application, the spectrum reservation flag of each subband of the current frequency area may be used to avoid repeated coding of a tonal component already reserved in bandwidth extension coding. This can improve tonal component coding efficiency.

In a possible implementation, if the value of the spectrum reservation flag of the current subband is the second flag value, a peak in the current subband is a candidate tonal component. The second flag value indicates that the quantity of frequency bins that are in the current subband and whose values of spectrum reservation flags are equal to the second preset value is less than or equal to the preset threshold. If the value of the spectrum reservation flag of the current subband is the second flag value, it indicates that the spectrum of the current subband is not reserved in bandwidth extension coding. Therefore, the candidate tonal component may be determined when the value of the spectrum reservation flag of the current subband is the second flag value.

In a possible implementation, the preset condition includes a spectrum value corresponding to a frequency bin before bandwidth extension coding that is equal to a spectrum value corresponding to the frequency bin after bandwidth extension coding. Further, the preset condition may be that the spectrum value corresponding to the frequency bin before bandwidth extension coding is equal to the spectrum value corresponding to the frequency bin after bandwidth extension coding. The preset condition may be that a spectrum value does not change before and after bandwidth extension coding, that is, a spectrum value corresponding to a frequency bin before bandwidth extension coding is equal to a spectrum value corresponding to the frequency bin after bandwidth extension coding. For another example, the preset condition may also be that an absolute value of a difference between a spectrum value corresponding to a frequency bin before bandwidth extension coding and a spectrum value corresponding to the frequency bin after bandwidth extension coding is less than or equal to a preset threshold. The preset condition is based on that a certain difference may exist between spectrum values before and after bandwidth extension coding, but spectrum information is reserved, that is, a difference between a spectrum value corresponding to a frequency bin before bandwidth extension coding and a spectrum value corresponding to the frequency bin after bandwidth extension coding is less than a preset threshold. In this embodiment of this application, the spectrum reservation flag of each frequency bin of the high-frequency band signal is determined by determining the preset condition. Based on the spectrum reservation flag of each frequency bin of the high-frequency band signal, repeated coding of a tonal component already reserved in bandwidth extension coding can be avoided. This can improve tonal component coding efficiency.

According to a second aspect, an embodiment of this application provides an audio coding apparatus, including an obtaining module configured to obtain a current frame of an audio signal, where the current frame includes a high-frequency band signal and a low-frequency band signal, a first coding module configured to perform first coding on the high-frequency band signal and the low-frequency band signal, to obtain a first coding parameter of the current frame, where first coding includes bandwidth extension coding, a flag determining module configured to determine a spectrum reservation flag of each frequency bin of the high-frequency band signal, where the spectrum reservation flag indicates whether a first spectrum corresponding to the frequency bin is reserved in a second spectrum corresponding to the frequency bin, the first spectrum includes a spectrum corresponding to the frequency bin before bandwidth extension coding, and the second spectrum includes a spectrum corresponding to the frequency bin after bandwidth extension coding, a second coding module configured to perform second coding on the high-frequency band signal based on the spectrum reservation flag of each frequency bin of the high-frequency band signal, to obtain a second coding parameter of the current frame, where the second coding parameter indicates information about a target tonal component of the high-frequency band signal, and the information about the tonal component includes location information, quantity information, and amplitude information or energy information of the tonal component, and a bitstream multiplexing module configured to perform bitstream multiplexing on the first coding parameter and the second coding parameter, to obtain a coded bitstream. In this embodiment of this application, a process of first coding includes bandwidth extension coding. The spectrum reservation flag of each frequency bin of the high-frequency band signal may be determined based on spectrums of the high-frequency band signal before and after bandwidth extension coding. Whether a spectrum of a frequency bin of the high-frequency band signal before bandwidth extension coding is reserved after bandwidth extension coding is indicated by using the spectrum reservation flag. Second coding is performed on the high-frequency band signal based on the spectrum reservation flag of each frequency bin of the high-frequency band signal, and the spectrum reservation flag of each frequency bin of the high-frequency band signal may be used to avoid repeated coding of a tonal component already reserved in bandwidth extension coding. This can improve tonal component coding efficiency.

In a possible implementation, the flag determining module is further configured to determine the spectrum reservation flag of each frequency bin of the high-frequency band signal based on the first spectrum, the second spectrum, and a frequency range of bandwidth extension coding.

In a possible implementation, a high-frequency band corresponding to the high-frequency band signal includes at least one frequency area, and the at least one frequency area includes a current frequency area. The second coding module is further configured to perform peak search based on a high-frequency band signal of the current frequency area, to obtain information about a peak in the current frequency area, where the information about the peak in the current frequency area includes quantity information of the peak, location information of the peak, and amplitude information of the peak or energy information of the peak in the current frequency area, perform peak screening on the information about the peak in the current frequency area based on the spectrum reservation flag of each frequency bin in the current frequency area, to obtain information about a candidate tonal component of the current frequency area, obtain information about a target tonal component of the current frequency area based on the information about the candidate tonal component of the current frequency area, and obtain the second coding parameter of the current frequency area based on the information about the target tonal component of the current frequency area.

In a possible implementation, the high-frequency band corresponding to the high-frequency band signal includes at least one frequency area, and the at least one frequency area includes the current frequency area. When a first frequency bin in the current frequency area does not belong to the frequency range of bandwidth extension coding, a value of a spectrum reservation flag of the first frequency bin is a first preset value. Alternatively, when a second frequency bin in the current frequency area belongs to the frequency range of bandwidth extension coding, a value of a spectrum reservation flag of the second frequency bin is a second preset value if a spectrum value corresponding to the second frequency bin before bandwidth extension coding and a spectrum value corresponding to the second frequency bin after bandwidth extension coding meet a preset condition, or the value of the spectrum reservation flag of the second frequency bin is a third preset value if the spectrum value corresponding to the second frequency bin before bandwidth extension coding and the spectrum value corresponding to the second frequency bin after bandwidth extension coding do not meet the preset condition.

In a possible implementation, the current frequency area includes at least one subband, and the second coding module is further configured to obtain a spectrum reservation flag of each subband of the current frequency area based on the spectrum reservation flag of each frequency bin in the current frequency area, and perform peak screening on the information about the peak in the current frequency area based on the spectrum reservation flag of each subband of the current frequency area, to obtain the information about the candidate tonal component of the current frequency area.

In a possible implementation, the at least one subband includes a current subband, and the second coding module is further configured to, if a quantity of frequency bins that are in the current subband and whose values of spectrum reservation flags are equal to the second preset value is greater than a preset threshold, determine that a value of a spectrum reservation flag of the current subband is a first flag value, where if a spectrum value corresponding to a frequency bin before bandwidth extension coding and a spectrum value corresponding to the frequency bin after bandwidth extension coding meet a preset condition, it is determined that a value of a spectrum reservation flag of the frequency bin is the second preset value, or if the quantity of frequency bins that are in the current subband and whose values of spectrum reservation flags are equal to the second preset value is less than or equal to the preset threshold, the value of the spectrum reservation flag of the current subband is a second flag value.

In a possible implementation, the second coding module is further configured to obtain, based on the location information of the peak in the current frequency area, a subband sequence number corresponding to a location of the peak in the current frequency area, and perform peak screening on the information about the peak in the current frequency area based on the subband sequence number corresponding to the location of the peak in the current frequency area and the spectrum reservation flag of each subband of the current frequency area, to obtain the information about the candidate tonal component of the current frequency area.

In a possible implementation, if the value of the spectrum reservation flag of the current subband is the second flag value, a peak in the current subband is a candidate tonal component.

In a possible implementation, the preset condition includes a spectrum value corresponding to a frequency bin before bandwidth extension coding that is equal to a spectrum value corresponding to the frequency bin after bandwidth extension coding.

In the second aspect of this application, the modules of the audio coding apparatus may further perform steps described in the first aspect and the possible implementations. For details, refer to the foregoing descriptions in the first aspect and the possible implementations.

According to a third aspect, an embodiment of this application provides an audio coding apparatus, including a non-volatile memory and a processor coupled to each other. The processor invokes program code stored in the memory to perform the method according to any one of first aspect.

According to a fourth aspect, an embodiment of this application provides an audio coding apparatus, including an encoder. The encoder is configured to perform the method according to any one of the first aspect.

According to a fifth aspect, an embodiment of this application provides a computer-readable storage medium, including a computer program. When the computer program is executed on a computer, the computer is enabled to perform the method according to any one of the first aspect.

According to a sixth aspect, an embodiment of this application provides a computer-readable storage medium, including a coded bitstream obtained by using the method according to any one of the first aspect.

According to a seventh aspect, this application provides a computer program product. The computer program product includes a computer program. When the computer program is executed by a computer, the method according to any one of the first aspect is performed.

According to an eighth aspect, this application provides a chip, including a processor and a memory. The memory is configured to store a computer program, and the processor is configured to invoke and run the computer program stored in the memory, to perform the method according to any one of the first aspect.

DESCRIPTION OF EMBODIMENTS

Embodiments of this application provide an audio coding method and an audio coding apparatus, to improve audio signal coding efficiency.

The following describes embodiments of this application with reference to accompanying drawings.

In the specification, claims, and accompanying drawings of this application, the terms "first", "second", and so on are intended to distinguish between similar objects but do not necessarily indicate a specific order or sequence. It should be understood that the terms used in such a way are interchangeable in proper circumstances, and this is merely a distinguishing manner used when objects that have a same attribute are described in embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

It should be understood that in this application, "at least one (item)" refers to one or more and "a plurality of" refers to two or more. The term "and/or" is used for describing an association relationship between associated objects, and represents that three relationships may exist. For example, "A and/or B" may represent the following three cases: only A exists, only B exists, and both A and B exist, where A and B may be singular or plural. The character "/" usually indicates an "or" relationship between the associated objects. "At least one of the following items (pieces)" or a similar expression thereof refers to any combination of these items, including any combination of singular items (pieces) or plural items (pieces). For example, at least one of a, b, or c may represent: a, b, c, "a and b", "a and c", "b and c", or "a, b and c". Each of a, b, and c may be singular or plural. Alternatively, some of a, b, and c may be singular, and some of a, b, and c may be plural.

Figure 1:
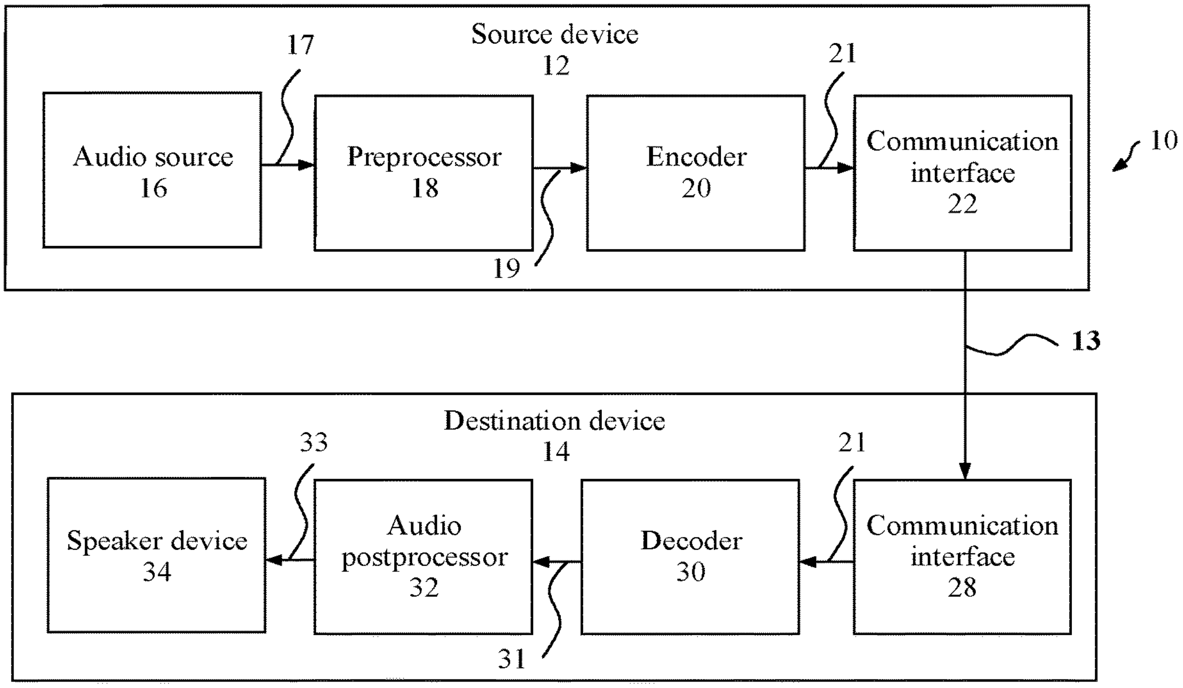
FIG. 1 is a schematic diagram of an example of an audio encoding and decoding system according to an embodiment of this application.

The following describes a system architecture to which an embodiment of this application is applied. Refer to FIG. 1. FIG. 1 shows a schematic block diagram of an example of an audio encoding and decoding system 10 to which an embodiment of this application is applied. As shown in FIG. 1, the audio encoding and decoding system 10 may include a source device 12 and a destination device 14. The source device 12 generates encoded audio data. Therefore, the source device 12 may be referred to as an audio coding apparatus. The destination device 14 can decode the encoded audio data generated by the source device 12. Therefore, the destination device 14 may be referred to as an audio decoding apparatus. In various implementation solutions, the source device 12, the destination device 14, or both the source device 12 and the destination device 14 may include one or more processors and a memory coupled to the one or more processors. The memory may include but is not limited to a random-access memory (RAM), a read-only memory (ROM), an electrically erasable programmable ROM (EEPROM), a flash memory, or any other medium that can be used to store desired program code in a form of an instruction or a data structure that can be accessed by a computer, as described in this specification. The source device 12 and the destination device 14 may include various apparatuses, including a desktop computer, a mobile computing apparatus, a notebook (for example, a laptop) computer, a tablet computer, a set-top box, a telephone handset such as a so-called "smart" phone, a television, a sound box, a digital media player, a video game console, an in-vehicle computer, a wireless communication device, or the like.

Although FIG. 1 depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such embodiments, the source device 12 or the corresponding functionality and the destination device 14 or the corresponding functionality may be implemented by using same hardware and/or software, separate hardware and/or software, or any combination thereof.

A communication connection between the source device 12 and the destination device 14 may be implemented over a link 13, and the destination device 14 may receive encoded audio data from the source device 12 over the link 13. The link 13 may include one or more media or apparatuses capable of moving the encoded audio data from the source device 12 to the destination device 14. In an example, the link 13 may include one or more communication media that enable the source device 12 to directly transmit the encoded audio data to the destination device 14 in real time. In this example, the source device 12 can modulate the encoded audio data according to a communication standard (for example, a wireless communication protocol), and can transmit modulated audio data to the destination device 14. The one or more communication media may include a wireless communication medium and/or a wired communication medium, for example, a radio frequency (RF) spectrum or one or more physical transmission lines. The one or more communication media may form a part of a packet-based network, and the packet-based network is, for example, a local area network, a wide area network, or a global network (for example, the internet). The one or more communication media may include a router, a switch, a base station, or another device that facilitates communication from the source device 12 to the destination device 14.

The source device 12 includes an encoder 20. Optionally, the source device 12 may further include an audio source 16, a preprocessor 18, and a communication interface 22. In a specific implementation, the encoder 20, the audio source 16, the preprocessor 18, and the communication interface 22 may be hardware components in the source device 12, or may be software programs in the source device 12. They are separately described as follows.

The audio source 16 may include or may be a sound capture device of any type configured to capture, for example, sound from the real world, and/or an audio generation device of any type. The audio source 16 may be a microphone configured to capture sound or a memory configured to store audio data, and the audio source 16 may further include any type of (internal or external) interface for storing previously captured or generated audio data and/or for obtaining or receiving audio data. When the audio source 16 is a microphone, the audio source 16 may be, for example, a local microphone or a microphone integrated into the source device. When the audio source 16 is a memory, the audio source 16 may be, for example, a local memory or a memory integrated into the source device. When the audio source 16 includes an interface, the interface may be, for example, an external interface for receiving audio data from an external audio source. For example, the external audio source is an external sound capture device such as a microphone, an external storage, or an external audio generation device. The interface may be any type of interface, for example, a wired or wireless interface or an optical interface, according to any proprietary or standardized interface protocol.

In this embodiment of this application, the audio data transmitted from the audio source 16 to the preprocessor 18 may also be referred to as raw audio data 17.

The preprocessor 18 is configured to receive and preprocess the raw audio data 17, to obtain preprocessed audio 19 or preprocessed audio data 19. For example, the preprocessing performed by the preprocessor 18 may include filtering or denoising.

The encoder 20 (or referred to as an audio encoder 20) is configured to receive the preprocessed audio data 19, and is configured to perform the embodiments described below, to implement application of the audio coding method described in this application on an encoder side.

The communication interface 22 may be configured to receive encoded audio data 21, and transmit the encoded audio data 21 to the destination device 14 or any other device (for example, a memory) over the link 13 for storage or direct reconstruction. The other device may be any device used for decoding or storage. The communication interface 22 may be, for example configured to encapsulate the encoded audio data 21 into an appropriate format, for example, a data packet, for transmission over the link 13.

The destination device 14 includes a decoder 30. Optionally, the destination device 14 may further include a communication interface 28, an audio postprocessor 32, and a speaker device 34. They are separately described as follows.

The communication interface 28 may be configured to receive the encoded audio data 21 from the source device 12 or any other source. The any other source is, for example, a storage device. The storage device is, for example, an encoded audio data storage device. The communication interface 28 may be configured to transmit or receive the encoded audio data 21 over the link 13 between the source device 12 and the destination device 14 or through any type of network. The link 13 is, for example, a direct wired or wireless connection. The any type of network is, for example, a wired or wireless network or any combination thereof, or any type of private or public network, or any combination thereof. The communication interface 28 may be, for example configured to decapsulate the data packet transmitted through the communication interface 22, to obtain the encoded audio data 21.

Both the communication interface 28 and the communication interface 22 may be configured as unidirectional communication interfaces or bidirectional communication interfaces, and may be configured to, for example, send and receive messages to establish a connection, and acknowledge and exchange any other information related to a communication link and/or data transmission such as encoded audio data transmission.

The decoder 30 (or referred to as an audio decoder 30) is configured to receive the encoded audio data 21 and provide decoded audio data 31 or decoded audio 31. In some embodiments, the decoder 30 may be configured to perform the embodiments described below, to implement application of the audio coding method described in this application on a decoder side.

The audio postprocessor 32 is configured to postprocess the decoded audio data 31 (also referred to as reconstructed audio data) to obtain postprocessed audio data 33. The postprocessing performed by the audio postprocessor 32 may include, for example, rendering or any other processing, and may be further configured to transmit the postprocessed audio data 33 to the speaker device 34.

The speaker device 34 is configured to receive the postprocessed audio data 33 to play audio to, for example, a user or a viewer. The speaker device 34 may be or may include any type of loudspeaker configured to play reconstructed sound.

Although FIG. 1 depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such embodiments, the source device 12 or the corresponding functionality and the destination device 14 or the corresponding functionality may be implemented by using same hardware and/or software, separate hardware and/or software, or any combination thereof.

As will be apparent for a person skilled in the art based on the descriptions, existence and (exact) split of functionalities of the different units or functionalities of the source device 12 and/or the destination device 14 shown in FIG. 1 may vary depend on an actual device and application. The source device 12 and the destination device 14 may include any one of a wide range of devices, including any type of handheld or stationary device, for example, a notebook or laptop computer, a mobile phone, a smartphone, a pad or a tablet computer, a video camera, a desktop computer, a set-top box, a television, a camera, a vehicle-mounted device, a sound box, a digital media player, an audio game console, an audio streaming transmission device (such as a content service server or a content distribution server), a broadcast receiver device, a broadcast transmitter device, smart glasses, or a smart watch, and may not use or may use any type of operating system.

The encoder 20 and the decoder 30 each may be implemented as any one of various appropriate circuits, for example, one or more microprocessors, digital signal processors (DSPs), application-specific integrated circuits (ASICs), field-programmable gate arrays (FPGAs), discrete logic, hardware, or any combinations thereof. If the technologies are implemented partially by using software, a device may store software instructions in an appropriate and non-transitory computer-readable storage medium and may execute the instructions by using hardware such as one or more processors, to perform the technologies of this disclosure. Any one of the foregoing content (including hardware, software, a combination of hardware and software, and the like) may be considered as one or more processors.

In some cases, the audio encoding and decoding system 10 shown in FIG. 1 is merely an example, and the technologies of this application are applicable to audio coding settings (for example, audio encoding or audio decoding) that do not necessarily include any data communication between an encoding device and a decoding device. In another example, data may be retrieved from a local memory, transmitted in a streaming manner through a network, or the like. An audio coding device may encode data and store data into the memory, and/or an audio decoding device may retrieve and decode the data from the memory. In some examples, the encoding and the decoding are performed by devices that do not communicate with one another, but simply encode data to the memory and/or retrieve and decode data from the memory.

The encoder may be a multi-channel encoder, for example, a stereo encoder, a 5.1-channel encoder, or a 7.1-channel encoder. Certainly, it may be understood that the foregoing encoder may also be a mono encoder.

The audio data may also be referred to as an audio signal. The audio signal in this embodiment of this application is an input signal in an audio coding device. The audio signal may include a plurality of frames. For example, a current frame may further refer to a frame in the audio signal. In embodiments of this application, audio signal encoding and decoding of a current frame are used as an example for description. A previous frame or a next frame of the current frame in the audio signal may be correspondingly encoded and decoded based on an audio signal encoding and decoding manner of the current frame. Encoding and decoding processes of the previous frame or the next frame of the current frame in the audio signal are not described one by one. In addition, the audio signal in embodiments of this application may be a mono audio signal, or may be a multi-channel signal, for example, a stereo signal. The stereo signal may be an original stereo signal, may be a stereo signal including two channels of signals (a left channel signal and a right channel signal) included in a multi-channel signal, or may be a stereo signal including two channels of signals generated by at least three channels of signals included in a multi-channel signal. This is not limited in embodiments of this application.

Figure 2:
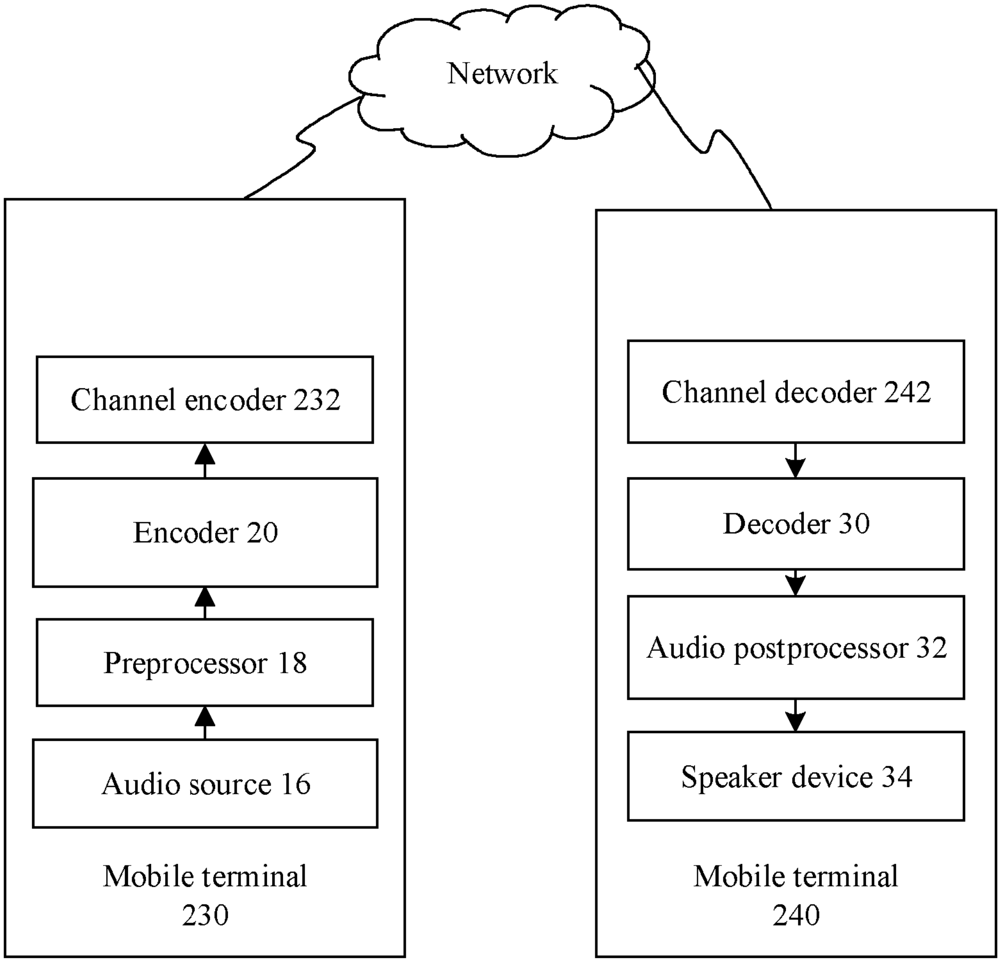
FIG. 2 is a schematic diagram of an audio coding application according to an embodiment of this application.

For example, as shown in FIG. 2, this embodiment is described with an example in which an encoder 20 is disposed in a mobile terminal 230, a decoder 30 is disposed in a mobile terminal 240, the mobile terminal 230 and the mobile terminal 240 are electronic devices that are independent of each other and have an audio signal processing capability, for example, mobile phones, wearable devices, virtual reality (VR) devices, or augmented reality (AR) devices, and the mobile terminal 230 and the mobile terminal 240 are connected through a wireless or wired network.

Optionally, the mobile terminal 230 may include an audio source 16, a preprocessor 18, an encoder 20, and a channel encoder 232. The audio source 16, the preprocessor 18, the encoder 20, and the channel encoder 232 are connected.

Optionally, the mobile terminal 240 may include a channel decoder 242, a decoder 30, an audio postprocessor 32, and a speaker device 34. The channel decoder 242, the decoder 30, the audio postprocessor 32, and the speaker device 34 are connected.

After obtaining an audio signal through the audio source 16, the mobile terminal 230 preprocesses the audio by using the preprocessor 18, encodes the audio signal by using the encoder 20 to obtain a coded bitstream, and then encodes the coded bitstream by using the channel encoder 232 to obtain a transmission signal.

The mobile terminal 230 sends the transmission signal to the mobile terminal 240 through a wireless or wired network.

After receiving the transmission signal, the mobile terminal 240 decodes the transmission signal by using the channel decoder 242 to obtain a coded bitstream, decodes the coded bitstream by using the decoder 30 to obtain an audio signal, processes the audio signal by using the audio postprocessor 32, and then plays the audio signal by using the speaker device 34. It may be understood that the mobile terminal 230 may also include functional modules included in the mobile terminal 240, and the mobile terminal 240 may also include functional modules included in the mobile terminal 230.

Figure 3:
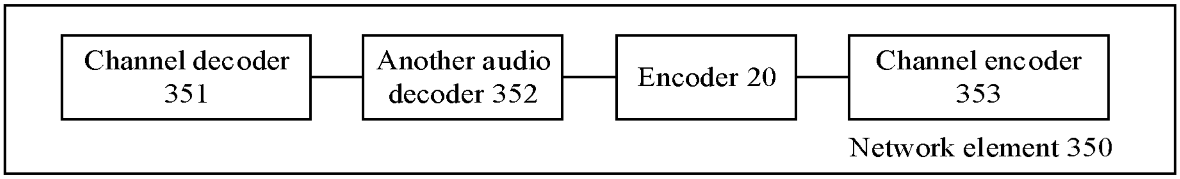
FIG. 3 is a schematic diagram of an audio coding application according to an embodiment of this application.

For example, as shown in FIG. 3, an example in which an encoder 20 and a decoder 30 are disposed in a network element 350 that has an audio signal processing capability in a same core network or wireless network is used for description. The network element 350 may implement transcoding, for example, convert a coded bitstream of another audio encoder (non-multi-channel encoder) into a coded bitstream of a multi-channel encoder. The network element 350 may be a media gateway, a transcoding device, a media resource server, or the like of a radio access network or a core network.

Optionally, the network element 350 includes a channel decoder 351, another audio decoder 352, an encoder 20, and a channel encoder 353. The channel decoder 351, the other audio decoder 352, the encoder 20, and the channel encoder 353 are connected.

After receiving a transmission signal sent by another device, the channel decoder 351 decodes the transmission signal to obtain a first coded bitstream, decodes the first coded bitstream by using the other audio decoder 352 to obtain an audio signal, encodes the audio signal by using the encoder 20 to obtain a second coded bitstream, and encodes the second coded bitstream by using the channel encoder 353 to obtain the transmission signal. That is, the first coded bitstream is converted into the second coded bitstream.

The other device may be a mobile terminal having an audio signal processing capability, or may be another network element having an audio signal processing capability. This is not limited in this embodiment.

Optionally, in this embodiment of this application, a device on which the encoder 20 is installed may be referred to as an audio coding device. In actual implementation, the audio coding device may also have an audio decoding function. This is not limited in this embodiment of this application.

Optionally, in this embodiment of this application, a device on which the decoder 30 is installed may be referred to as an audio decoding device. During actual implementation, the audio decoding device may also have an audio encoding function. This is not limited in this embodiment of this application.

The encoder may perform the audio coding method in embodiments of this application. A process of first coding includes bandwidth extension coding. A spectrum reservation flag of each frequency bin of a high-frequency band signal may be determined based on spectrums of the high-frequency band signal before and after bandwidth extension coding and a frequency range of bandwidth extension coding. Whether a spectrum value of a frequency bin of the high-frequency band signal before bandwidth extension coding is reserved after bandwidth extension coding is indicated by using the spectrum reservation flag. Second coding is performed on the high-frequency band signal based on the spectrum reservation flag of each frequency bin of the high-frequency band signal, and the spectrum reservation flag of each frequency bin of the high-frequency band signal may be used to avoid repeated coding of a tonal component already reserved in bandwidth extension coding. This can improve tonal component coding efficiency.

For example, first coding performed by the encoder or a core encoder inside the encoder on a high-frequency band signal and a low-frequency band signal includes bandwidth extension coding, so that a spectrum reservation flag of each frequency bin of the high-frequency band signal may be recorded, that is, whether a spectrum of each frequency bin changes before and after bandwidth extension is determined based on the spectrum reservation flag of each frequency bin of the high-frequency band signal. The spectrum reservation flag of each frequency bin of the high-frequency band signal may be used to avoid repeated coding of a tonal component already reserved in bandwidth extension coding. This can improve tonal component coding efficiency. For a specific implementation thereof, refer to the following specific explanation and description of the embodiment shown in FIG. 4.

Figure 4:
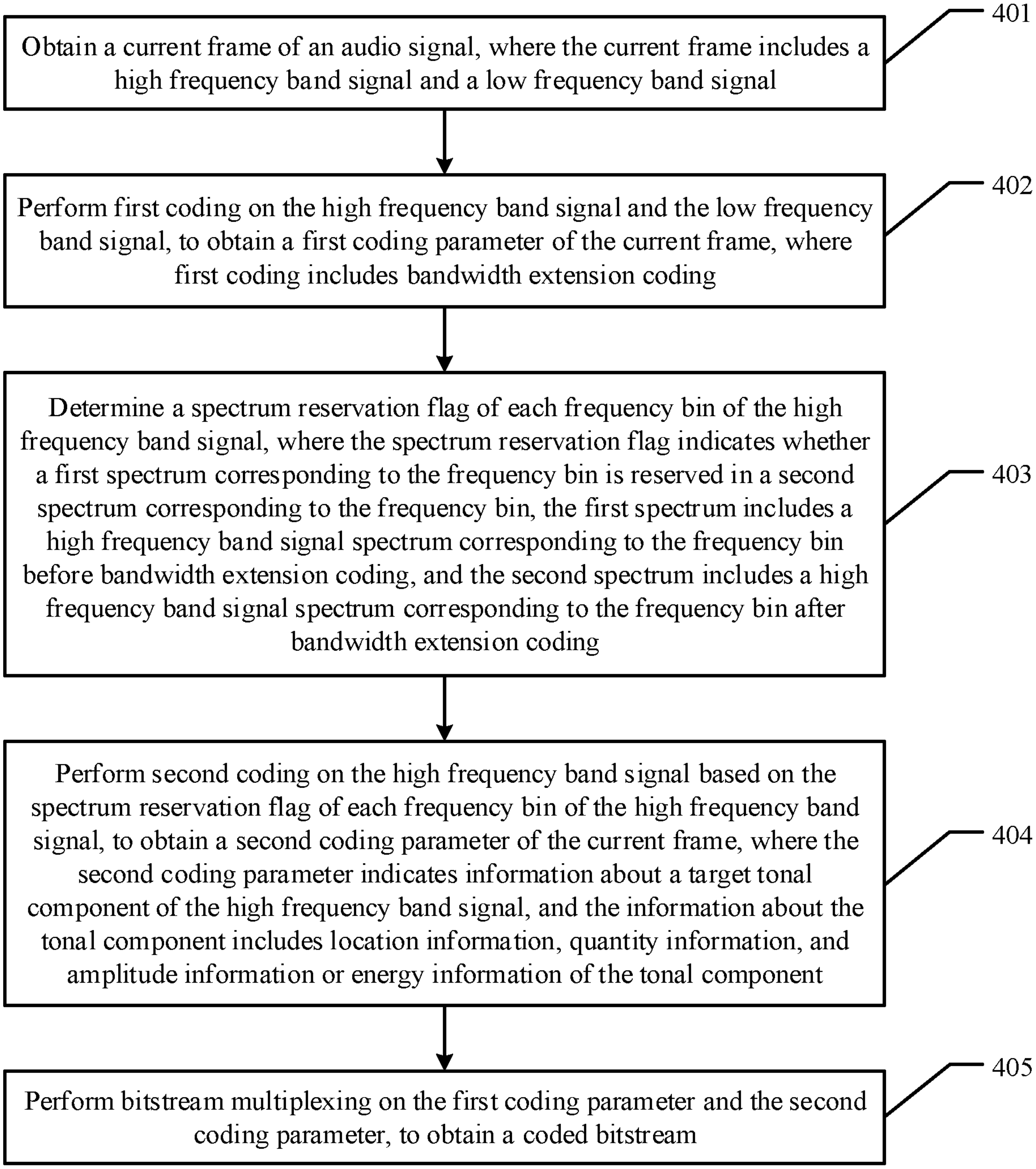
FIG. 4 is a flowchart of an audio coding method according to an embodiment of this application.

FIG. 4 is a flowchart of an audio coding method according to an embodiment of this application. This embodiment of this application may be executed by the foregoing encoder or a core encoder inside the encoder. As shown in FIG. 4, the method in this embodiment may include the following steps.

401: Obtain a current frame of an audio signal, where the current frame includes a high-frequency band signal and a low-frequency band signal.

The current frame may be any frame in the audio signal, and the current frame may include a high-frequency band signal and a low-frequency band signal. Classification of the high-frequency band signal and the low-frequency band signal may be determined by using a frequency band threshold. For example, a signal above the frequency band threshold is a high-frequency band signal, and a signal below the frequency band threshold is a low-frequency band signal. The frequency band threshold may be determined based on a transmission bandwidth, and data processing capabilities of an audio coding apparatus and an audio decoding apparatus. This is not limited herein.

The high-frequency band signal and the low-frequency band signal are relative. For example, a signal below a frequency threshold is a low-frequency band signal, and a signal above the frequency threshold is a high-frequency band signal (a signal corresponding to the frequency threshold may be classified into either the low-frequency band signal or the high-frequency band signal). The frequency threshold varies according to a bandwidth of the current frame. For example, when the current frame is a wideband signal with a signal bandwidth 0 kilohertz to 8 kilohertz (kHz), the frequency threshold may be 4 kHz, or when the current frame is an ultra-wideband signal with a signal bandwidth 0 kHz to 16 kHz, the frequency threshold may be 8 kHz.

It should be noted that, in this embodiment of the present disclosure, the high-frequency band signal may be a part or all of signals in a high-frequency area. Further, the high-frequency area varies according to different signal bandwidths of the current frame, and also varies according to different frequency thresholds. For example, when the signal bandwidth of the current frame is 0 kHz to 8 kHz, and the frequency threshold is 4 kHz, the high-frequency area is 4 kHz to 8 kHz. In this case, the high-frequency band signal may be a 4 kHz to 8 kHz signal covering the entire high-frequency area, or may be a signal covering only a part of the high-frequency area. For example, high-frequency band signals may be 4 kHz to 7 kHz, 5 kHz to 8 kHz, 5 kHz to 7 kHz, or 4 kHz to 6 kHz and 7 kHz to 8 kHz (that is, the high-frequency band signals may be discontiguous in the frequency domain). When the signal bandwidth of the current frame is 0 kHz to 16 kHz, and the frequency threshold is 8 kHz, the high-frequency area is 8 kHz to 16 kHz. In this case, the high-frequency band signal may be an 8 kHz to 16 kHz signal covering the entire high-frequency area, or may be a signal covering only a part of the high-frequency area. For example, high-frequency band signals may be 8 kHz to 15 kHz, 9 kHz to 16 kHz, 9 kHz to 15 kHz, or 8 kHz to 10 kHz and 11 kHz to 16 kHz (that is, the high-frequency band signals may be discontiguous in the frequency domain). It may be understood that a frequency range covered by the high-frequency band signal may be set as required, or may be adaptively determined based on a frequency range on which subsequent second coding needs to be performed, for example, may be adaptively determined based on a frequency range on which tonal component detection needs to be performed.

402: Perform first coding on the high-frequency band signal and the low-frequency band signal, to obtain a first coding parameter of the current frame, where first coding includes bandwidth extension coding.

After obtaining the high-frequency band signal and the low-frequency band signal, the audio coding apparatus may perform first coding on the high-frequency band signal and the low-frequency band signal. First coding may include bandwidth extension coding, and bandwidth extension coding may also be referred to as bandwidth extension. Bandwidth extension coding (that is, audio bandwidth extension coding, referred to as bandwidth extension below) is introduced in a process of first coding, and a bandwidth extension coding parameter (or bandwidth extension parameter) may be obtained through bandwidth extension coding. A decoder side may reconstruct information about the high-frequency in the audio signal based on the bandwidth extension coding parameter. This expands an effective bandwidth of the audio signal and improves quality of the audio signal.

In this embodiment of this application, the high-frequency band signal and the low-frequency band signal are encoded in the process of first coding, to obtain the first coding parameter of the current frame. The first coding parameter may be used for bitstream multiplexing.

In some embodiments, in addition to bandwidth extension coding, first coding may further include processing such as temporal noise shaping, frequency domain noise shaping, or spectrum quantization. Correspondingly, in addition to the bandwidth extension coding parameter, the first coding parameter may further include a temporal noise shaping parameter, a frequency domain noise shaping parameter, or a spectrum quantization parameter. For the process of first coding, details are not described in this embodiment of this application.

403: Determine a spectrum reservation flag of each frequency bin of the high-frequency band signal, where the spectrum reservation flag indicates whether a first spectrum corresponding to the frequency bin is reserved in a second spectrum corresponding to the frequency bin, the first spectrum includes a high-frequency band signal spectrum corresponding to the frequency bin before bandwidth extension coding, and the second spectrum includes a high-frequency band signal spectrum corresponding to the frequency bin after bandwidth extension coding.

In this embodiment of this application, bandwidth extension coding is performed on the high-frequency signal in first coding, and whether a spectrum changes before and after bandwidth extension coding may be recorded for each frequency bin of the high-frequency signal. For example, the first spectrum is the high-frequency band signal spectrum corresponding to the frequency bin before bandwidth extension coding, and the second spectrum is the high-frequency band signal spectrum corresponding to the frequency bin after bandwidth extension coding. In this case, the audio coding apparatus may generate the spectrum reservation flag of each frequency bin of the high-frequency band signal. The spectrum reservation flag of each frequency bin of the high-frequency band signal indicates whether the first spectrum corresponding to the frequency bin is reserved in the second spectrum corresponding to the frequency bin.

It should be noted that, in step 403, the spectrum reservation flag of each frequency bin of the high-frequency band signal is determined, where each frequency bin of the high-frequency band signal refers to each frequency bin for which a spectrum reservation flag needs to be determined in the high-frequency band signal. If a frequency range on which tonal component detection needs to be performed is predetermined, a frequency range on which the spectrum reservation flag needs to be determined in the high-frequency band signal is not the entire frequency range of the high-frequency band signal. Therefore, only a spectrum reservation flag of each frequency bin in the frequency range on which tonal component detection needs to be performed may be obtained. In addition, the high-frequency band signal in step 403 may also be a high-frequency band signal in the frequency range on which tonal component detection needs to be performed. The frequency range on which tonal component detection needs to be performed may be determined based on a quantity of frequency areas on which tonal component detection needs to be performed. Further, the quantity of frequency areas on which tonal component detection needs to be performed may be specified in advance.

In some embodiments of this application, determining the spectrum reservation flag of each frequency bin of the high-frequency band signal in step 403 includes determining the spectrum reservation flag of each frequency bin of the high-frequency band signal based on the first spectrum, the second spectrum, and a frequency range of bandwidth extension coding.

In a process of bandwidth extension coding, a signal spectrum (that is, the first spectrum) before bandwidth extension coding, a signal spectrum (that is, the second spectrum) after bandwidth extension coding, and the frequency range of bandwidth extension coding may be obtained. The frequency range of bandwidth extension coding may be a frequency bin range of bandwidth extension coding. For example, the frequency range of bandwidth extension coding includes a start frequency bin and an end frequency bin for IGF processing. Alternatively, the frequency range of bandwidth extension coding may be represented in another manner. For example, the frequency range of bandwidth extension coding is represented based on a start frequency value and an end frequency value of bandwidth extension coding.

In the process of first coding provided in this embodiment of this application, a high-frequency band may be divided into K frequency areas (for example, a frequency area is represented as a tile), and each frequency area is further divided into M frequency bands. Values of K and M are not limited. The frequency range of bandwidth extension coding may be determined by using a frequency area as a unit, or may be determined by using a frequency band as a unit.

The audio coding apparatus may obtain a value of the spectrum reservation flag of each frequency bin in the high-frequency band signal in a plurality of manners, which is described in detail in the following.

In some embodiments of this application, a high-frequency band corresponding to the high-frequency band signal includes at least one frequency area, and the at least one frequency area includes a current frequency area.

When a first frequency bin in the current frequency area does not belong to the frequency range of bandwidth extension coding, a value of a spectrum reservation flag of the first frequency bin is a first preset value.

Alternatively, when a second frequency bin in the current frequency area belongs to the frequency range of bandwidth extension coding, a value of a spectrum reservation flag of the second frequency bin is a second preset value if a spectrum value corresponding to the second frequency bin before bandwidth extension coding and a spectrum value corresponding to the second frequency bin after bandwidth extension coding meet a preset condition, or the value of the spectrum reservation flag of the second frequency bin is a third preset value if the spectrum value corresponding to the second frequency bin before bandwidth extension coding and the spectrum value corresponding to the second frequency bin after bandwidth extension coding do not meet the preset condition.

The first preset value indicates that the first frequency bin in the current frequency area does not belong to the frequency range of bandwidth extension coding. The second preset value indicates that the second frequency bin in the current frequency area belongs to the frequency range of bandwidth extension coding, and the spectrum value corresponding to the second frequency bin before bandwidth extension coding and the spectrum value corresponding to the second frequency bin after bandwidth extension coding meet the preset condition. The third preset value indicates that the second frequency bin in the current frequency area belongs to the frequency range of bandwidth extension coding, and the spectrum value corresponding to the second frequency bin before bandwidth extension coding and the spectrum value corresponding to the second frequency bin after bandwidth extension coding do not meet the preset condition.

Further, an audio coding apparatus first determines whether one or more frequency bins in the current frequency area belong to the frequency range of bandwidth extension coding. For example, the first frequency bin is defined as a frequency bin that is in the current frequency area and that does not belong to the frequency range of bandwidth extension coding, and the second frequency bin is defined as a frequency bin that is in the current frequency area and that belongs to the frequency range of bandwidth extension coding. The value of the spectrum reservation flag of the first frequency bin is the first preset value, and the spectrum reservation flag of the second frequency bin has two values, for example, the second preset value and the third preset value respectively. Further, when the spectrum value corresponding to the second frequency bin before bandwidth extension coding and the spectrum value corresponding to the second frequency bin after bandwidth extension coding meet the preset condition, the value of the spectrum reservation flag of the second frequency bin is the second preset value. When the spectrum value corresponding to the second frequency bin before bandwidth extension coding and the spectrum value corresponding to the second frequency bin after bandwidth extension coding do not meet the preset condition, the value of the spectrum reservation flag of the second frequency bin is the third preset value. The preset condition may be implemented in a plurality of manners. This is not limited herein. For example, the preset condition is a condition specified for a spectrum value before bandwidth extension coding and a spectrum value after bandwidth extension coding, which may be determined based on an application scenario.

In some embodiments of this application, the preset condition includes a spectrum value corresponding to a second frequency bin before bandwidth extension coding that is equal to a spectrum value corresponding to the second frequency bin after bandwidth extension coding.

Further, the preset condition may be that the spectrum value corresponding to the second frequency bin before bandwidth extension coding is equal to the spectrum value corresponding to the second frequency bin after bandwidth extension coding. The preset condition is that a spectrum value does not change before and after bandwidth extension coding, that is, the spectrum value corresponding to the second frequency bin before bandwidth extension coding is equal to the spectrum value corresponding to the second frequency bin after bandwidth extension coding. For another example, the preset condition may also be that an absolute value of a difference between the spectrum value corresponding to the second frequency bin before bandwidth extension coding and the spectrum value corresponding to the second frequency bin after bandwidth extension coding is less than or equal to a preset threshold. The preset condition is based on that a certain difference may exist between spectrum values before and after bandwidth extension coding, but spectrum information is reserved, that is, the difference between the spectrum value corresponding to the second frequency bin before bandwidth extension coding and the spectrum value corresponding to the second frequency bin after bandwidth extension coding is less than the preset threshold. In this embodiment of this application, the spectrum reservation flag of each frequency bin of the high-frequency band signal is determined by determining the preset condition. Based on the spectrum reservation flag of each frequency bin of the high-frequency band signal, repeated coding of a tonal component already reserved in bandwidth extension coding can be avoided. This can improve tonal component coding efficiency.

For example, a value of a spectrum reservation flag corresponding to a frequency bin that does not belong to the frequency range of bandwidth extension coding is set to the first preset value. For a frequency bin that belongs to the frequency range of bandwidth extension coding, if a spectrum value corresponding to the frequency bin before bandwidth extension coding is equal to a spectrum value corresponding to the frequency bin after bandwidth extension coding, a value of a spectrum reservation flag of the frequency bin is set to the second preset value. If the spectrum value corresponding to the frequency bin before bandwidth extension coding is not equal to the spectrum value corresponding to the frequency bin after bandwidth extension coding, the value of the spectrum reservation flag of the frequency bin is set to the third preset value In a specific embodiment of this application, a signal spectrum before bandwidth extension coding, that is, a modified discrete cosine transform (mdct) spectrum before IGF, is denoted as mdctSpectrumBeforeIGF. A signal spectrum after bandwidth extension coding, that is, an mdct spectrum after IGF, is denoted as mdctSpectrumAfterIGF. The spectrum reservation flag of the frequency bin is denoted as igfActivityMask. For example, the first preset value is −1, the second preset value is 1, and the third preset value is 0. If the value of igfActivityMask is −1, it indicates that the frequency bin is outside the frequency band processed by IGF (that is, the frequency range of bandwidth extension coding). If the value of igfActivityMask is 0, it indicates that the frequency bin is not reserved (that is, the spectrum value of the frequency bin has been set to zero during bandwidth extension coding). If the value of igfActivityMask is 1, it indicates that the frequency bin is reserved (that is, the spectrum value remains unchanged before and after bandwidth extension coding).

Further, a method for obtaining igfActivityMask is as follows:

$$igfActivityMask[sb] = -1,\ sb \in [0,\ igfBgn)$$

$$igfActivityMask[sb] \begin{cases} = 0 & mdctSpectrumBeforeIGF[sb]\ != mdctSpectrumAfterIGF[sb] \\ = 1 & mdctSpectrumBeforeIGF[sb] == mdctSpectrumAfterIGF[sb] \end{cases},$$

$$sb \in [igfBgn,\ igfEnd).$$

$$igfActivityMask[sb] = -1,\ sb \in [igfEnd,\ blockSize).$$

sb is a frequency bin sequence number, igfBgn and igfEnd are respectively a start frequency bin and an end frequency bin for IGF processing, and blockSize is a maximum frequency bin sequence number of the high-frequency band.

404: Perform second coding on the high-frequency band signal based on the spectrum reservation flag of each frequency bin of the high-frequency band signal, to obtain a second coding parameter of the current frame, where the second coding parameter indicates information about a target tonal component of the high-frequency band signal, and the information about the tonal component includes location information, quantity information, and amplitude information or energy information of the tonal component.

In this embodiment of this application, after obtaining the spectrum reservation flag of each frequency bin of the high-frequency band signal, the audio coding apparatus may perform second coding on the high-frequency band signal based on the spectrum reservation flag of each frequency bin of the high-frequency band signal. In a process of second coding, the audio coding apparatus may determine, by parsing the spectrum reservation flag of each frequency bin, which frequency bin changes before and after bandwidth extension and which frequency does not change before and after bandwidth extension, that is, the audio coding apparatus may determine whether each frequency bin of the high-frequency band signal has been encoded in the process of first coding. A frequency bin of the high-frequency band signal that has been encoded in the process of first coding may not be encoded in the process of second coding. Therefore, the spectrum reservation flag of each frequency bin of the high-frequency band signal may be used to avoid repeated coding of a tonal component already reserved in bandwidth extension coding. This can improve tonal component coding efficiency.

Further, the audio coding apparatus may obtain the second coding parameter of the current frame through the foregoing second coding, and the second coding parameter indicates the information about the target tonal component of the high-frequency band signal. The target tonal component refers to a tonal component obtained through second coding on the high-frequency band signal. For example, the target tonal component may further refer to one or more tonal components in the high-frequency band signal. In this embodiment of this application, there are a plurality of types of the information about the target tonal component. For example, the information about the target tonal component may include location information, quantity information, and amplitude information or energy information of the target tonal component. Only one of the amplitude information or the energy information may be included in the target tonal component. For example, the information about the target tonal component may include the location information, the quantity information, and the amplitude information of the target tonal component. For another example, the information about the target tonal component may include the location information, the quantity information, and the energy information of the target tonal component.

In some embodiments of this application, the second coding parameter includes a location-quantity parameter of the target tonal component and an amplitude parameter or an energy parameter of the target tonal component. The location-quantity parameter indicates the location information and the quantity information of the target tonal component of the high-frequency band signal, the amplitude parameter indicates the amplitude information of the target tonal component of the high-frequency band signal, and the energy parameter indicates the energy information of the target tonal component of the high-frequency band signal.

For example, the second coding parameter includes the location-quantity parameter of the tonal component, and the amplitude parameter or the energy parameter of the tonal component. The location-quantity parameter represents that a location of the tonal component and a quantity of tonal components are represented by a same parameter. In another implementation, the second coding parameter includes a location parameter of the tonal component, a quantity parameter of the tonal component, and an amplitude parameter or an energy parameter of the tonal component. In this case, a location of the tonal component and a quantity of tonal components may be represented by using different parameters.

In a specific implementation, the high-frequency band corresponding to the high-frequency band signal includes at least one frequency area, and the at least one frequency area includes the current frequency area. A location-quantity parameter of a target tonal component of the current frequency area and an amplitude parameter or an energy parameter of the target tonal component of the current frequency area are determined based on a high-frequency band signal of the current frequency area in the at least one frequency area and a spectrum reservation flag of each frequency bin in the current frequency area.

For example, peak screening is performed on information of a peak in the current frequency area based on the spectrum reservation flag of each frequency bin in the current frequency area, to obtain information about a candidate tonal component of the current frequency area. The information about the candidate tonal component includes quantity information, location information, and amplitude information or energy information of the candidate tonal component. For example, the quantity information of the candidate tonal component may be quantity information of the peak after peak screening, the location information of the candidate tonal component may be location information of the peak after peak screening, the amplitude information of the candidate tonal component may be amplitude information of the peak after peak screening, and the energy information of the candidate tonal component may be energy information of the peak after peak screening. The location-quantity parameter, and the amplitude parameter or the energy parameter of the target tonal component of the current frequency area may be obtained based on the information about the candidate tonal component.

Further, the information about the candidate tonal component includes the quantity information, the location information, and the amplitude information or the energy information of the candidate tonal component. For example, the quantity information, the location information, and the amplitude information or the energy information of the candidate tonal component are used as quantity information, location information, and amplitude information or energy information of the target tonal component of the current frequency area. The location-quantity parameter, and the amplitude parameter or the energy parameter of the target tonal component of the current frequency area are obtained based on the quantity information, the location information, the amplitude information or the energy information of the target tonal component of the current frequency area.

For another example, other processing may be performed based on the quantity information, the location information, and the amplitude information or the energy information of the candidate tonal component, to obtain processed quantity information, location information, and amplitude information or energy information of the candidate tonal component. The processed quantity information, location information, and amplitude information or energy information of the candidate tonal component are used as quantity information, location information, and amplitude information or energy information of the target tonal component of the current frequency area. The location-quantity parameter, and the amplitude parameter or the energy parameter of the target tonal component of the current frequency area are obtained based on the quantity information, the location information, the amplitude information or the energy information of the target tonal component of the current frequency area. The other processing may be one or more of processing such as combination processing, quantity screening, and inter-frame continuity correction. Whether to perform other processing, a type included in the other processing, and a processing method are not limited in this embodiment of this application.

405: Perform bitstream multiplexing on the first coding parameter and the second coding parameter, to obtain a coded bitstream.

In the foregoing embodiment, the audio coding apparatus obtains the first coding parameter in step 402, obtains the second coding parameter in step 404, and finally performs bitstream multiplexing on the first coding parameter and the second coding parameter, to obtain the coded bitstream. For example, the coded bitstream may be a payload bitstream. The payload bitstream may carry specific information of each frame of the audio signal, for example, may carry information about a tonal component of each frame.

In some embodiments of this application, the coded bitstream may further include a configuration bitstream, and the configuration bitstream may carry configuration information shared by all frames in the audio signal. The payload bitstream and the configuration bitstream may be independent of each other, or may be included in a same bitstream, that is, the payload bitstream and the configuration bitstream may be different parts in a same bitstream.

For example, bitstream multiplexing is performed on the first coding parameter and the second coding parameter, to obtain the coded bitstream. According to the audio coding apparatus in this application, information of the spectrum reservation flag of bandwidth extension coding is determined, and in the process of obtaining the second coding parameter, repeated coding of a tonal component already reserved in bandwidth extension coding is avoided based on information of the spectrum reservation flag of each frequency bin of the high-frequency band signal. This improves tonal component coding efficiency.

The audio coding apparatus sends the coded bitstream to an audio decoding apparatus, and the audio decoding apparatus performs bitstream demultiplexing on the coded bitstream, to obtain the coding parameter, and further accurately obtain the current frame of the audio signal.

It can be learned from the example description of this application by using the foregoing embodiment that, a current frame of an audio signal is obtained, where the current frame includes a high-frequency band signal and a low-frequency band signal, first coding is performed on the high-frequency band signal and the low-frequency band signal, to obtain a first coding parameter of the current frame, where first coding includes bandwidth extension coding, a spectrum reservation flag of each frequency bin of the high-frequency band signal is determined, where the spectrum reservation flag indicates whether a first spectrum corresponding to the frequency bin is reserved in a second spectrum corresponding to the frequency bin, the first spectrum is a high-frequency band signal spectrum corresponding to the frequency bin before bandwidth extension coding, and the second spectrum is a high-frequency band signal spectrum corresponding to the frequency bin after bandwidth extension coding, second coding is performed on the high-frequency band signal based on the spectrum reservation flag of each frequency bin of the high-frequency band signal, to obtain a second coding parameter of the current frame, where the second coding parameter indicates information about a target tonal component of the high-frequency band signal, and the information about the target tonal component includes location information, quantity information, and amplitude information or energy information of the target tonal component, and bitstream multiplexing is performed on the first coding parameter and the second coding parameter, to obtain a coded bitstream. In this embodiment of this application, a process of first coding includes bandwidth extension coding. The spectrum reservation flag of each frequency bin of the high-frequency band signal may be determined based on spectrums of the high-frequency band signal before and after bandwidth extension coding and a frequency range of bandwidth extension coding. Whether a spectrum value of one or more frequency bins of the high-frequency band signal before bandwidth extension coding is reserved after bandwidth extension coding is indicated by using the spectrum reservation flag. Second coding is performed on the high-frequency band signal based on the spectrum reservation flag of each frequency bin of the high-frequency band signal, and the spectrum reservation flag of each frequency bin of the high-frequency band signal may be used to avoid repeated coding of a tonal component already reserved in bandwidth extension coding. This can improve tonal component coding efficiency.

Figure 5:
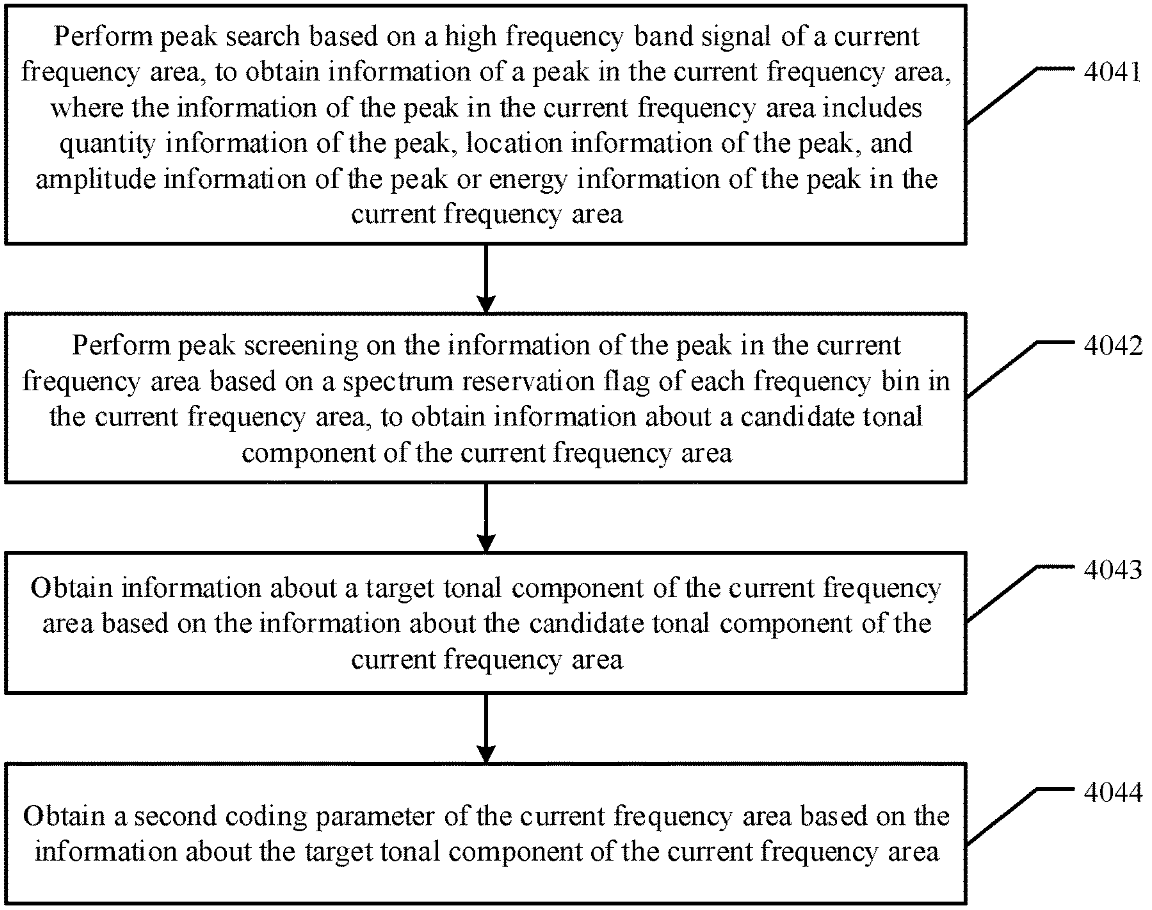
FIG. 5 is a flowchart of another audio coding method according to an embodiment of this application.

Next, refer to some other embodiments provided in this application. As shown in FIG. 5, the high-frequency band corresponding to the high-frequency band signal includes at least one frequency area, and performing second coding on the high-frequency band signal based on the spectrum reservation flag of each frequency bin of the high-frequency band signal, to obtain the second coding parameter of the current frame in step 404 includes the following steps.

4041: Perform peak search based on the high-frequency band signal of the current frequency area, to obtain information about a peak in the current frequency area, where the information about the peak in the current frequency area includes quantity information of the peak, location information of the peak, and amplitude information of the peak or energy information of the peak in the current frequency area.

The audio coding apparatus may perform peak search based on the high-frequency band signal of the current frequency area. For example, search is performed in the current frequency area for whether a peak exists. The quantity information of the peak, the location information of the peak, and the amplitude information or the energy information of the peak in the current frequency area may be obtained through peak search.

Further, a power spectrum of the high-frequency band signal of the current frequency area may be obtained based on the high-frequency band signal of the current frequency area. A peak of the power spectrum is searched for based on the power spectrum of the high-frequency band signal of the current frequency area (or current area). A quantity of peaks is used as the quantity information of the peak in the current area, a frequency bin sequence number corresponding to the peak is used as the location information of the peak in the current area, and amplitude or energy of the peak is used as the amplitude information or energy information of the peak in the current area. Alternatively, a power spectrum ratio of a current frequency bin in the current frequency area may be obtained based on the high-frequency band signal of the current frequency area, where the power spectrum ratio of the current frequency bin is a ratio of a power spectrum value of the current frequency bin to a mean value of power spectrums of the current frequency area. Peak search is performed in the current frequency area based on the power spectrum ratio of the current frequency bin, to obtain the quantity information of the peak, the location information of the peak, the amplitude information of the peak or the energy information of the peak in the current frequency area. The energy information or the amplitude information includes a power spectrum ratio. For example, a power spectrum ratio of a peak is a ratio of a power spectrum value of a frequency bin corresponding to a location of the peak to a mean value of power spectrums of a current frequency area. Certainly, in this embodiment of this application, peak search may also be performed in another manner to obtain the quantity information of the peak, the location information of the peak, and the amplitude information or the energy information of the peak in the current area. This is not limited in this embodiment of this application.

In an embodiment of this application, the audio coding apparatus may store the location information of the peak and the energy information of the peak in the current frequency area in peak_idx and peak_val arrays respectively, and store the quantity information of the peak in the current frequency area in peak_cnt.

The high-frequency band signal on which peak search is performed may be a frequency domain signal, or may be a time domain signal.

Further, in an implementation, peak search may be performed based on at least one of a power spectrum, an energy spectrum, or an amplitude spectrum of the current frequency area.

4042: Perform peak screening on the information about the peak in the current frequency area based on the spectrum reservation flag of each frequency bin in the current frequency area, to obtain information about a candidate tonal component of the current frequency area.

The audio coding apparatus may obtain, based on information of the spectrum reservation flag of each frequency bin in the current frequency area and the quantity information of the peak, the location information of the peak, and the amplitude information or the energy information of the peak in the current frequency area, screened quantity information of the peak, location information of the peak, and amplitude information or energy information of the peak in the current frequency area. The screened quantity information of the peak, the location information of the peak, and the amplitude information or the energy information of the peak is the information about the candidate tonal component of the current frequency area.

For example, the amplitude information or the energy information of the peak may include an energy ratio of the peak, or a power spectrum ratio of the peak. The audio coding apparatus may also obtain other information representing energy or amplitude of the peak in peak search, for example, a power spectrum value of a frequency bin corresponding to the location of the peak. The power spectrum ratio of the peak is a ratio of a power spectrum value of the peak to the mean value of power spectrums of the current frequency area, that is, a ratio of the power spectrum value of the frequency bin corresponding to the location of the peak to the mean value of power spectrums of the current frequency area. Similarly, a power spectrum ratio of the candidate tonal component is a ratio of a power spectrum value of the candidate tonal component to the mean value of power spectrums of the current frequency area, that is, a ratio of a power spectrum value of a frequency bin corresponding to the location of the candidate tonal component to the mean value of power spectrums of the current frequency area.

It should be noted that, in this embodiment of this application, peak screening may be directly performed based on the spectrum reservation flag of each frequency bin in the current frequency area, to obtain the candidate tonal component of the current frequency area. Alternatively, a spectrum reservation flag of each subband of the current frequency area may be determined based on the spectrum reservation flag of each frequency bin in the current frequency area, and then peak screening is performed based on the spectrum reservation flag of each subband of the current frequency area. For details, refer to examples in subsequent embodiments.

4043: obtain information about a target tonal component of the current frequency area based on the information about the candidate tonal component of the current frequency area.

After obtaining the information about the candidate tonal component of the current frequency area, the audio coding apparatus may perform processing based on the information about the candidate tonal component of the current frequency area, to obtain the information about the target tonal component of the current frequency area. The target tonal component may be a tonal component obtained after candidate tonal components are combined, the target tonal component may be a tonal component obtained after quantity screening is performed on candidate tonal components, and the target tonal component may be a tonal component obtained after inter-frame continuity processing is performed on candidate tonal components. An implementation of obtaining the target tonal component is not limited herein.

4044: Obtain the second coding parameter of the current frequency area based on the information about the target tonal component of the current frequency area.

In this embodiment of this application, the audio coding apparatus may obtain the second coding parameter of the current frequency area based on the information about the target tonal component of the current frequency area, where the second coding parameter includes the location-quantity parameter, and the amplitude parameter or the energy parameter of the target tonal component. The location-quantity parameter indicates the location information and the quantity information of the target tonal component of the high-frequency band signal, the amplitude parameter indicates the amplitude information of the target tonal component of the high-frequency band signal, and the energy parameter indicates the energy information of the target tonal component of the high-frequency band signal.

It can be learned from the foregoing descriptions of step 4041 to step 4044 that, in this embodiment of this application, peak screening is performed on the information about the peak in the current frequency area based on the spectrum reservation flag of each frequency bin in the current frequency area, to obtain the information about the candidate tonal component of the current frequency area. The spectrum reservation flag of each frequency bin of the high-frequency band signal may be used to avoid repeated coding of a tonal component already reserved in bandwidth extension coding. This can improve tonal component coding efficiency.

Figure 6:
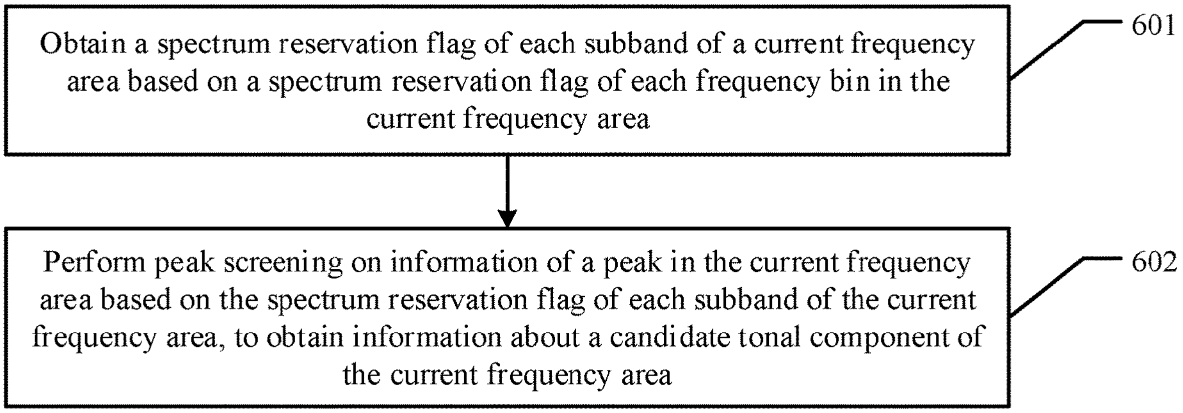
FIG. 6 is a flowchart of another audio coding method according to an embodiment of this application.

Next, refer to some other embodiments provided in this application. The high-frequency band corresponding to the high-frequency band signal includes at least one frequency area, and one frequency area includes at least one subband. As shown in FIG. 6, performing peak screening on the information about the peak in the current frequency area based on the spectrum reservation flag of each frequency bin in the current frequency area, to obtain the information about the candidate tonal component of the current frequency area in the foregoing step 4042 includes the following steps.

601: Obtain a spectrum reservation flag of each subband of the current frequency area based on the spectrum reservation flag of each frequency bin in the current frequency area.

The high-frequency band corresponding to the high-frequency band signal includes at least one frequency area, and one frequency area includes at least one subband. The audio coding apparatus may determine a value of the spectrum reservation flag of each frequency bin based on the spectrum reservation flag of each frequency bin in the current frequency area. A frequency bin in the current frequency area may belong to a certain subband. Therefore, a value of a spectrum reservation flag of a subband may be determined based on a value of a spectrum reservation flag of a frequency bin in the subband. In the manner above, the audio coding apparatus may obtain the spectrum reservation flag of each subband of the current frequency area.

Further, in some embodiments of this application, obtaining the spectrum reservation flag of each subband of the current frequency area based on the spectrum reservation flag of each frequency bin in the current frequency area in the foregoing step 601 includes, if a quantity of frequency bins that are in a current subband and whose values of spectrum reservation flags are equal to the second preset value is greater than a preset threshold, determining that a value of a spectrum reservation flag of the current subband is a first flag value, where if a spectrum value corresponding to a frequency bin before bandwidth extension coding and a spectrum value corresponding to the frequency bin after bandwidth extension coding meet a preset condition, a value of a spectrum reservation flag of the frequency bin is the second preset value, or if the quantity of frequency bins that are in the current subband and whose values of spectrum reservation flags are equal to the second preset value is less than or equal to the preset threshold, determining that the value of the spectrum reservation flag of the current subband is a second flag value.

The first flag value indicates that the quantity of frequency bins that are in the current subband and whose values of spectrum reservation flags are equal to the second preset value is greater than the preset threshold. If the spectrum value corresponding to the frequency bin before bandwidth extension coding and the spectrum value corresponding to the frequency bin after bandwidth extension coding meet the preset condition, the value of the spectrum reservation flag of the frequency bin is the second preset value, and the frequency bin is the frequency bin in the current subband. The second flag value indicates that the quantity of frequency bins that are in the current subband and whose values of spectrum reservation flags are equal to the second preset value is less than or equal to the preset threshold.

The spectrum reservation flag of the current subband may have a plurality of values. For example, the spectrum reservation flag of the current subband is the first flag value, or the spectrum reservation flag of the current subband is the second flag value, which may be further determined based on the quantity of frequency bins that are in the current subband and whose values of spectrum reservation flags are equal to the second preset value. Specific values of the first flag value and the second flag value are not limited in this embodiment of this application.

In some embodiments of this application, the preset condition includes a spectrum value corresponding to a frequency bin before bandwidth extension coding that is equal to a spectrum value corresponding to the frequency bin after bandwidth extension coding.

Further, the preset condition may be that the spectrum value corresponding to the frequency bin before bandwidth extension coding is equal to the spectrum value corresponding to the frequency bin after bandwidth extension coding. The preset condition may be that a spectrum value does not change before and after bandwidth extension coding, that is, a spectrum value corresponding to a frequency bin before bandwidth extension coding is equal to a spectrum value corresponding to the frequency bin after bandwidth extension coding. For another example, the preset condition may also be that an absolute value of a difference between a spectrum value corresponding to a frequency bin before bandwidth extension coding and a spectrum value corresponding to the frequency bin after bandwidth extension coding is less than or equal to a preset threshold. The preset condition is based on that a certain difference may exist between spectrum values before and after bandwidth extension coding, but spectrum information is reserved, that is, a difference between a spectrum value corresponding to a frequency bin before bandwidth extension coding and a spectrum value corresponding to the frequency bin after bandwidth extension coding is less than a preset threshold. In this embodiment of this application, the spectrum reservation flag of each frequency bin of the high-frequency band signal is determined by determining the preset condition. Based on the spectrum reservation flag of each frequency bin of the high-frequency band signal, repeated coding of a tonal component already reserved in bandwidth extension coding can be avoided. This can improve tonal component coding efficiency.

For example, a value of a spectrum reservation flag corresponding to a frequency bin that does not belong to the frequency range of bandwidth extension coding is set to the first preset value. For a frequency bin that belongs to the frequency range of bandwidth extension coding, if a spectrum value corresponding to the frequency bin before bandwidth extension coding is equal to a spectrum value corresponding to the frequency bin after bandwidth extension coding, a value of a spectrum reservation flag of the frequency bin is set to the second preset value. If the spectrum value corresponding to the frequency bin before bandwidth extension coding is not equal to the spectrum value corresponding to the frequency bin after bandwidth extension coding, the value of the spectrum reservation flag of the frequency bin is set to the third preset value For example, in a method for obtaining the spectrum reservation flag of each subband of the current frequency area, further, the spectrum reservation flag of the current subband may be determined based on spectrum reservation flags of all frequency bins in the current subband. For example, if the quantity of frequency bins that are in the current subband and whose values of spectrum reservation flags are equal to the second preset value is greater than the preset threshold, the spectrum reservation flag of the current subband is 1. Otherwise, the spectrum reservation flag of the current subband is 0.

In a specific embodiment, information of the spectrum reservation flag of bandwidth extension coding is denoted as igfActivityMask, and the spectrum reservation flag of each subband of the current frequency area (tile) is denoted as subband_enc_flag[num_subband], where num_subband is a quantity of subbands of the current frequency area (tile). A method for obtaining subband_enc_flag includes the following steps.

Step 1: Determine a quantity of subbands.

For a $p^{th}$ tile, a quantity num_subband of subbands included in the tile is calculated:

$$num\_subband=tile\_width[p]/tone\_res[p].$$

tone_res[p] is a frequency domain resolution (that is, a subband width) of a subband in the $p^{th}$ frequency area, and tile_width is a width of the $p^{th}$ tile (a quantity of frequency bins included in the $p^{th}$ frequency area). A calculation process is as follows:

$$tile\_width=tile[p+1]-tile[p].$$

tile[p] and tile[p+1] are start frequency bin sequence numbers of the $p^{th}$ tile and the $(p+1)^{th}$ tile respectively.

Step 2: Obtain a spectrum reservation flag of each subband.

It is assumed that whether a spectrum is reserved in each subband is marked as subband_enc_flag[num_subband], and pseudocode for obtaining this parameter is as follows:

```
for i=0 to num_subband−1:
  cntEnc=0
  startIdx=tile[p]+tone_res[p]*i
  stopIdx=tile[p]+tone_res[p]*(i+1)
  for j=startIdx to stopIdx−1:
    cntEnc+=igfActivityMask[j]
  end
  if cntEnc>0:
    subband_enc_flag[i]=1
  end
end
```

cntEnc is a spectrum reservation counter, and is used to count a frequency bin in a range of an $i^{th}$ subband in the $p^{th}$ frequency area and whose value of a spectrum reservation flag igfActivityMask is equal to the second preset value, startIdx is a start frequency bin sequence number of the $i^{th}$ subband, and stopIdx and a start frequency bin sequence number of the $(i+1)^{th}$ subband.

The pseudocode for obtaining subband_enc_flag parameter may also be in the following form:

```
for i=0 to num_subband−1:
  entEnc=0
  startIdx=tile[p]+tone_res[p]*i
  stopIdx=tile[p]+tone_res[p]*(i+1)
  for j=startIdx to stopIdx−1:
    if igfActivityMask[j]==IGF_Activity
cntEnc++,
end
  end
  if cntEnc>Th1:
    subband_enc_flag[i]=1
  end
end
```

IGF_Activity is the second preset value, and IGF_Activity is set to 1 in this embodiment. Th1 is the preset threshold, and is set to 0 in this embodiment.

602: Perform peak screening on the information about the peak in the current frequency area based on the spectrum reservation flag of each subband of the current frequency area, to obtain information about a candidate tonal component of the current frequency area.

In this embodiment of this application, peak screening in the foregoing step 4042 may also be performed based on a subband. Therefore, the audio coding apparatus may perform peak screening on the information about the peak in the current frequency area based on the spectrum reservation flag of each subband of the current frequency area.

For example, based on the information about the spectrum reservation flag of each frequency bin in the current frequency area and the quantity information of the peak, the location information of the peak, and the amplitude information or the energy information of the peak in the current frequency area, screened quantity information of the peak, location information of the peak, and amplitude information or energy information of the peak in the current frequency area are obtained. For example, the spectrum reservation flag of each subband of the current frequency area is obtained based on the spectrum reservation flag of each frequency bin in the current frequency area. Based on the spectrum reservation flag of each frequency bin in the current frequency area and the quantity information of the peak, the location information of the peak, and the amplitude information or the energy information of the peak in the current frequency area, the screened quantity information of the peak, location information of the peak, and amplitude information or energy information of the peak in the current frequency area are obtained.

Further, in some embodiments of this application, performing peak screening on the information about the peak in the current frequency area based on the spectrum reservation flag of each subband of the current frequency area, to obtain the information about the candidate tonal component of the current frequency area in the foregoing step 602 includes the following steps.

A1: Obtain, based on the location information of the peak in the current frequency area, a subband sequence number corresponding to a location of the peak in the current frequency area.

A2: Perform peak screening on the information about the peak in the current frequency area based on the subband sequence number corresponding to the location of the peak in the current frequency area and the spectrum reservation flag of each subband of the current frequency area, to obtain the information about the candidate tonal component of the current frequency area.

Peak screening is performed on the information about the peak in the current frequency area based on the subband sequence number corresponding to the location of the peak in the current frequency area and the spectrum reservation flag of each subband of the current frequency area, to obtain screened quantity information of the peak, location information of the peak, and amplitude information or energy information of the peak in the current frequency area as the information about the candidate tonal component of the current frequency area.

Further, in some embodiments of this application, if the value of the spectrum reservation flag of the current subband is the second flag value, a peak in the current subband is a candidate tonal component. The second flag value indicates that the quantity of frequency bins that are in the current subband and whose values of spectrum reservation flags are equal to the second preset value is less than or equal to the preset threshold. If the value of the spectrum reservation flag of the current subband is the second flag value, it indicates that the spectrum of the current subband is not reserved in bandwidth extension coding. Therefore, the candidate tonal component may be determined when the value of the spectrum reservation flag of the current subband is the second flag value.

Further, if a spectrum reservation flag corresponding to a first subband sequence number corresponding to a location of a peak in the current frequency area is the first flag value, it may be determined that the information about the candidate tonal component of the current frequency area does not include location information and amplitude information or energy information of the peak corresponding to the first subband sequence number. Alternatively, if a spectrum reservation flag corresponding to a second subband sequence number corresponding to a location of a peak in the current frequency area is the second flag value, it may be determined that the location information of the candidate tonal component of the current frequency area includes location information of the peak corresponding to the second subband sequence number, the amplitude information or the energy information of the candidate tonal component of the current frequency area includes amplitude information or energy information of the peak corresponding to the second subband sequence number, and the quantity information of the candidate tonal component of the current frequency area is equal to a total quantity of peaks in all subbands that are of the current frequency area and whose values of the spectrum reservation flag are the second flag value.

For example, obtaining the screened quantity information of the peak, location information of the peak, and amplitude information or energy information of the peak in the current frequency area based on the subband sequence number corresponding to the location of the peak in the current frequency area and the spectrum reservation flag of each subband of the current frequency area may include, if a subband spectrum reservation flag corresponding to the subband sequence number corresponding to the location of the peak in the current frequency area is 1, location information of the peak and corresponding amplitude or energy information of the peak are removed from a result of peak search. Otherwise, the location information of the peak and the corresponding amplitude or energy information of the peak are reserved. The reserved location information and amplitude or energy information of the peak constitute the screened location information of the peak and the amplitude information of the peak or the energy information of the peak. The screened quantity information of the peak is equal to a quantity of peaks in the current frequency area minus a quantity of removed peaks.

In a specific embodiment, in the current frequency area, for peak_cnt power spectrum peaks obtained through peak search, a sequence number subband_idx of a subband in which each location information peak_idx of a peak is located is sequentially determined. If a reserved spectrum (that is, subband_enc_flag[subband_idx]==1) exists in the subband, the peak is removed. The quantity of peaks removed from the current frequency area is denoted as peak_cnt_remove, and a quantity of peaks processed in this step is updated to peak_cnt=peak_cnt−peak_cnt_remove.

In this embodiment of this application, the spectrum reservation flag of each subband of the current frequency area may be used to avoid repeated coding of a tonal component already reserved in bandwidth extension coding. This can improve tonal component coding efficiency.

Figure 7:
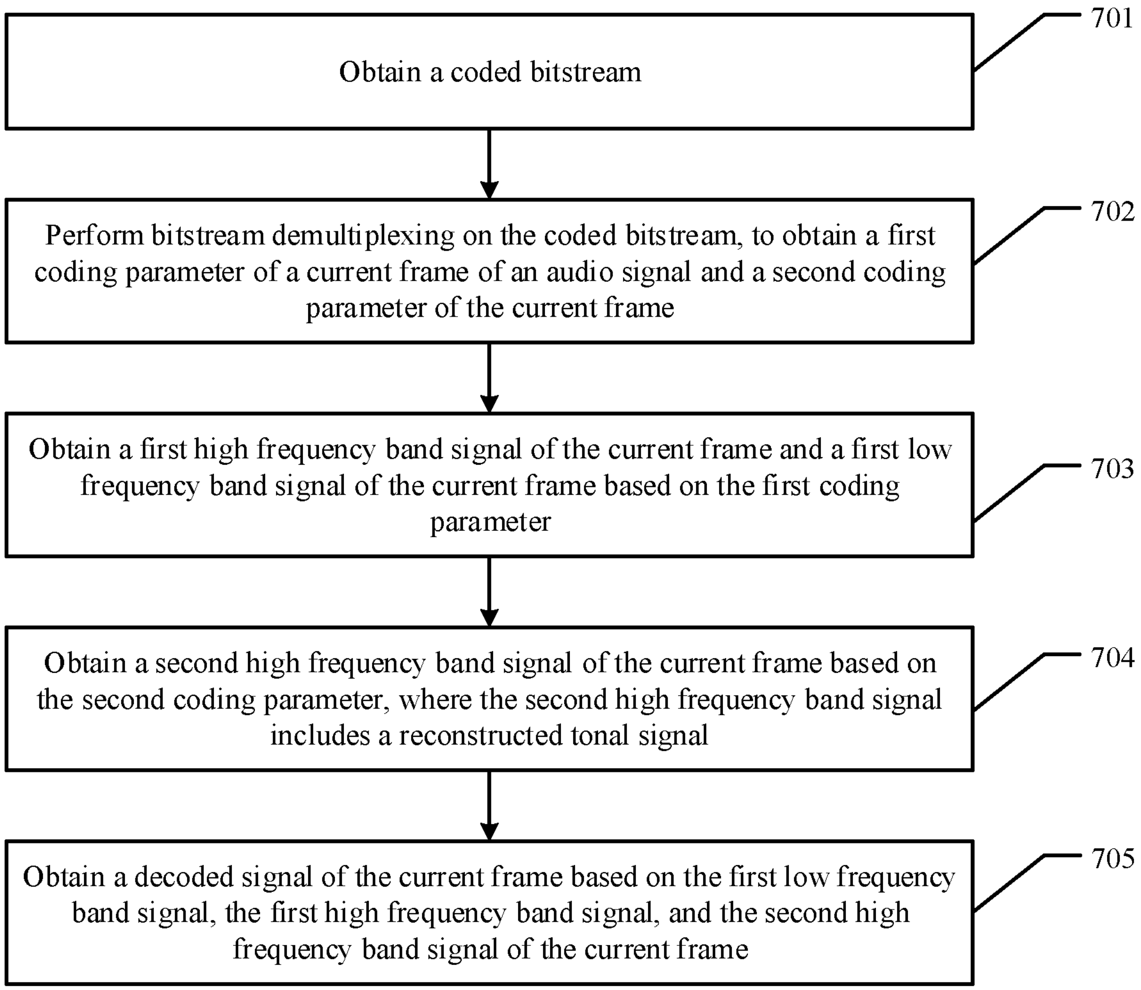
FIG. 7 is a flowchart of an audio decoding method according to an embodiment of this application.

The audio coding method performed by the audio coding apparatus is described in the foregoing embodiment. The following describes an audio decoding method performed by an audio decoding apparatus provided in an embodiment of this application. As shown in FIG. 7, the method mainly includes the following steps.

701: Obtain a coded bitstream.

The coded bitstream is sent by an audio coding apparatus to an audio decoding apparatus.

702: Perform bitstream demultiplexing on the coded bitstream, to obtain a first coding parameter of a current frame of an audio signal and a second coding parameter of the current frame.

For the first coding parameter and the second coding parameter, refer to the foregoing audio coding method. Details are not described herein again.

703: Obtain a first high-frequency band signal of the current frame and a first low-frequency band signal of the current frame based on the first coding parameter.

The first high-frequency band signal may include at least one of a decoded high-frequency band signal obtained through direct decoding based on the first coding parameter, and an extended high-frequency band signal obtained through bandwidth extension based on the first low-frequency band signal.

704: Obtain a second band signal of the current frame based on the second coding parameter, where the second high-frequency band signal includes a reconstructed tonal signal.

The second coding parameter may include information about a tonal component of the high-frequency band signal. For example, the second coding parameter of the current frame includes a location-quantity parameter of a tonal component, and an amplitude parameter or an energy parameter of the tonal component. For another example, the second coding parameter of the current frame includes a location parameter and a quantity parameter of a tonal component, and an amplitude parameter or an energy parameter of the tonal component. For the second coding parameter of the current frame, refer to the coding method. Details are not described herein again.

Similar to a processing procedure on an encoder side, in a processing procedure on a decoder side, a process of obtaining a reconstructed high-frequency band signal of the current frame based on the second coding parameter is also performed based on division into frequency areas and/or division into subbands of a high-frequency band. A high-frequency band corresponding to the high-frequency band signal includes at least one frequency area, and one of such frequency area includes at least one subband. A quantity of frequency areas of the second coding parameter that needs to be determined may be given in advance, or may be obtained from a bitstream. Herein, an example in which a reconstructed high-frequency band signal of a current frame is obtained based on a location-quantity parameter of a tonal component and an amplitude parameter of the tonal component in a frequency area is used for further description. Details may be as follows: determine a location of the tonal component of the current frequency area based on the location-quantity parameter of the tonal component of the current frequency area, determine, based on the amplitude parameter or the energy parameter of the tonal component of the current frequency area, amplitude or energy corresponding to the location of the tonal component, obtain the reconstructed tonal signal based on the location of the tonal component of the current frequency area and the amplitude or the energy corresponding to the location of the tonal component, and obtain the reconstructed high-frequency band signal based on the reconstructed tonal signal.

705: Obtain a decoded signal of the current frame based on the first low-frequency band signal, the first high-frequency band signal, and the second high-frequency band signal of the current frame.

In this embodiment of this application, the information about the spectrum reservation flag of each frequency bin of the high-frequency band signal is determined. In the process of obtaining the second coding parameter, the quantity information of the peak, the location information of the peak, and the amplitude information or the energy information of the peak of the high-frequency band signal are screened based on the information about the spectrum reservation flag of each frequency bin of the high-frequency band signal, to avoid repeated coding of a tonal component already reserved in bandwidth extension coding. This improves tonal component coding efficiency. On a corresponding decoder side, a high-frequency band signal reserved in a process of bandwidth extension coding is not decoded repeatedly, so the decoding efficiency is also improved correspondingly.

It should be noted that, for brief description, the foregoing method embodiments are represented as a series of actions. However, a person skilled in the art should appreciate that this application is not limited to the described order of the actions, because according to this application, some steps may be performed in other orders or simultaneously. It should be further appreciated by a person skilled in the art that embodiments described in this specification all belong to example embodiments, and the involved actions and modules are not necessarily required by this application.

To better implement the solutions of embodiments of this application, a related apparatus for implementing the solutions is further provided below.

Figure 8:
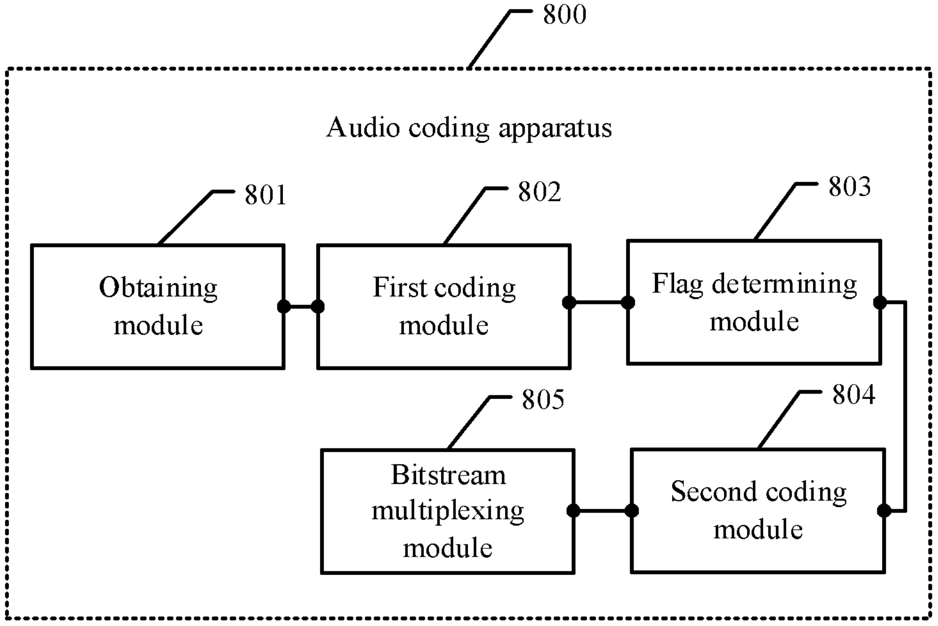
FIG. 8 is a schematic diagram of an audio coding apparatus according to an embodiment of this application.

Refer to FIG. 8. An audio coding apparatus 800 provided in an embodiment of this application may include an obtaining module 801, a first coding module 802, a flag determining module 803, a second coding module 804, and a bitstream multiplexing module 805.

The obtaining module is configured to obtain a current frame of an audio signal, where the current frame includes a high-frequency band signal and a low-frequency band signal.

The first coding module is configured to perform first coding on the high-frequency band signal and the low-frequency band signal, to obtain a first coding parameter of the current frame, where first coding includes bandwidth extension coding.

The flag determining module is configured to determine a spectrum reservation flag of each frequency bin of the high-frequency band signal, where the spectrum reservation flag indicates whether a first spectrum corresponding to the frequency bin is reserved in a second spectrum corresponding to the frequency bin. The first spectrum includes a spectrum corresponding to the frequency bin before bandwidth extension coding, and the second spectrum includes a spectrum corresponding to the frequency bin after bandwidth extension coding.

The second coding module is configured to perform second coding on the high-frequency band signal based on the spectrum reservation flag of each frequency bin of the high-frequency band signal, to obtain a second coding parameter of the current frame. The second coding parameter indicates information about a target tonal component of the high-frequency band signal, and the information about the target tonal component includes location information, quantity information, and amplitude information or energy information of the target tonal component.

The bitstream multiplexing module is configured to perform bitstream multiplexing on the first coding parameter and the second coding parameter, to obtain a coded bitstream.

In some embodiments of this application, the flag determining module is further configured to determine the spectrum reservation flag of each frequency bin of the high-frequency band signal based on the first spectrum, the second spectrum, and a frequency range of bandwidth extension coding.

In some embodiments of this application, a high-frequency band corresponding to the high-frequency band signal includes at least one frequency area, and the at least one frequency area includes a current frequency area.

The second coding module is further configured to perform peak search based on a high-frequency band signal of the current frequency area, to obtain information about a peak in the current frequency area, where the information about the peak in the current frequency area includes quantity information of the peak, location information of the peak, and amplitude information of the peak or energy information of the peak in the current frequency area, perform peak screening on the information about the peak in the current frequency area based on the spectrum reservation flag of each frequency bin in the current frequency area, to obtain information about a candidate tonal component of the current frequency area, obtain information about a target tonal component of the current frequency area based on the information about the candidate tonal component of the current frequency area, and obtain the second coding parameter of the current frequency area based on the information about the target tonal component of the current frequency area.

In some embodiments of this application, the second coding parameter includes a location-quantity parameter of the target tonal component, and an amplitude parameter or an energy parameter of the target tonal component. The location-quantity parameter indicates the location information and the quantity information of the target tonal component of the high-frequency band signal, the amplitude parameter indicates the amplitude information of the target tonal component of the high-frequency band signal, and the energy parameter indicates the energy information of the target tonal component of the high-frequency band signal.

In some embodiments of this application, the high-frequency band corresponding to the high-frequency band signal includes at least one frequency area, and the at least one frequency area includes the current frequency area.

When a first frequency bin in the current frequency area does not belong to the frequency range of bandwidth extension coding, a value of a spectrum reservation flag of the first frequency bin is a first preset value.

Alternatively, when a second frequency bin in the current frequency area belongs to the frequency range of bandwidth extension coding, a value of a spectrum reservation flag of the second frequency bin is a second preset value if a spectrum value corresponding to the second frequency bin before bandwidth extension coding and a spectrum value corresponding to the second frequency bin after bandwidth extension coding meet a preset condition, or the value of the spectrum reservation flag of the second frequency bin is a third preset value if the spectrum value corresponding to the second frequency bin before bandwidth extension coding and the spectrum value corresponding to the second frequency bin after bandwidth extension coding do not meet the preset condition.

In some embodiments of this application, the current frequency area includes at least one subband, and the second coding module is further configured to obtain a spectrum reservation flag of each subband of the current frequency area based on the spectrum reservation flag of each frequency bin in the current frequency area, and perform peak screening on the information about the peak in the current frequency area based on the spectrum reservation flag of each subband of the current frequency area, to obtain the information about the candidate tonal component of the current frequency area.

In some embodiments of this application, the at least one subband includes a current subband, and the second coding module is further configured to, if a quantity of frequency bins that are in the current subband and whose values of spectrum reservation flags are equal to the second preset value is greater than a preset threshold, determine that a value of a spectrum reservation flag of the current subband is a first flag value, where if a spectrum value corresponding to a frequency bin before bandwidth extension coding and a spectrum value corresponding to the frequency bin after bandwidth extension coding meet a preset condition, a value of a spectrum reservation flag of the frequency bin is the second preset value, or if the quantity of frequency bins that are in the current subband and whose values of spectrum reservation flags are equal to the second preset value is less than or equal to the preset threshold, determine that the value of the spectrum reservation flag of the current subband is a second flag value.

In some embodiments of this application, the second coding module is further configured to obtain, based on the location information of the peak in the current frequency area, a subband sequence number corresponding to a location of the peak in the current frequency area, and perform peak screening on the information about the peak in the current frequency area based on the subband sequence number corresponding to the location of the peak in the current frequency area and the spectrum reservation flag of each subband of the current frequency area, to obtain the information about the candidate tonal component of the current frequency area.

In some embodiments of this application, if the value of the spectrum reservation flag of the current subband is the second flag value, a peak in the current subband is a candidate tonal component.

In some embodiments of this application, the preset condition includes a spectrum value corresponding to a frequency bin before bandwidth extension coding that is equal to a spectrum value corresponding to the frequency bin after bandwidth extension coding.

It can be learned from the example description by using the foregoing embodiment that, a current frame of an audio signal is obtained, where the current frame includes a high-frequency band signal and a low-frequency band signal, first coding is performed on the high-frequency band signal and the low-frequency band signal, to obtain a first coding parameter of the current frame, where first coding includes bandwidth extension coding, a spectrum reservation flag of each frequency bin of the high-frequency band signal is determined, where the spectrum reservation flag indicates whether a first spectrum corresponding to the frequency bin is reserved in a second spectrum corresponding to the frequency bin, the first spectrum is a high-frequency band signal spectrum corresponding to the frequency bin before bandwidth extension coding, and the second spectrum is a high-frequency band signal spectrum corresponding to the frequency bin after bandwidth extension coding, second coding is performed on the high-frequency band signal based on the spectrum reservation flag of each frequency bin of the high-frequency band signal, to obtain a second coding parameter of the current frame, where the second coding parameter indicates information about a target tonal component of the high-frequency band signal, and the information about the target tonal component includes location information, quantity information, and amplitude information or energy information of the target tonal component, and bitstream multiplexing is performed on the first coding parameter and the second coding parameter, to obtain a coded bitstream. In this embodiment of this application, a process of first coding includes bandwidth extension coding. Each frequency bin of the high-frequency band signal corresponds to a spectrum reservation flag. Whether a spectrum of a frequency bin of the high-frequency band signal before bandwidth extension coding is reserved after bandwidth extension coding is indicated by using the spectrum reservation flag. Second coding is performed on the high-frequency band signal based on the spectrum reservation flag of each frequency bin of the high-frequency band signal, and the spectrum reservation flag of each frequency bin of the high-frequency band signal may be used to avoid repeated coding of a tonal component already reserved in bandwidth extension coding. This can improve tonal component coding efficiency.

It should be noted that, content such as information exchange between the modules/units of the apparatus and the execution processes thereof is based on the same idea as the method embodiments of this application, and produces the same technical effects as the method embodiments of this application. For specific content, refer to the foregoing description in the method embodiments of this application. Details are not described herein again.

Based on a same concept as the foregoing method, an embodiment of this application provides an audio signal encoder. The audio signal encoder is configured to code an audio signal, and includes, for example, the encoder described in the foregoing one or more embodiments. The audio coding apparatus is configured to perform coding to generate a corresponding bitstream.

Figure 9:
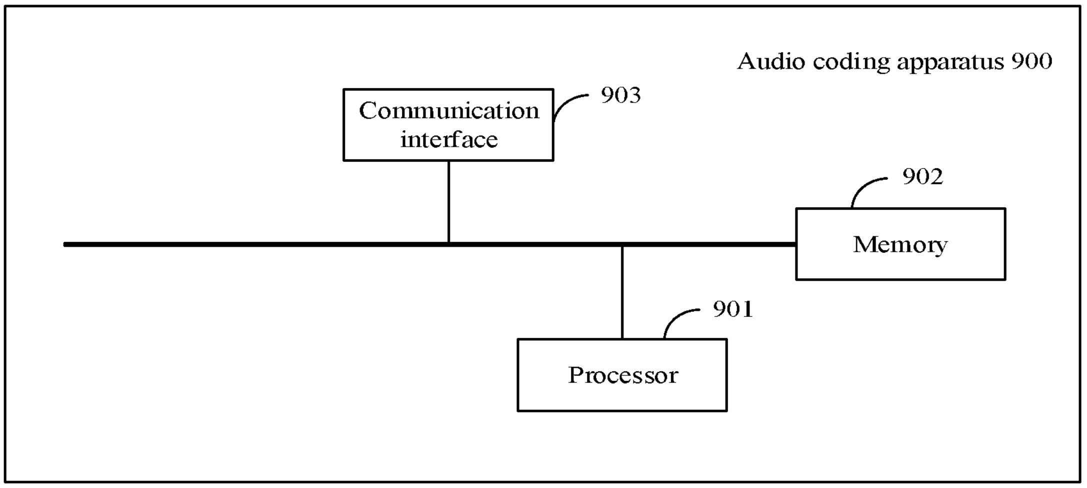
FIG. 9 is a schematic diagram of an audio coding apparatus according to an embodiment of this application.

Based on a same concept as the foregoing method, an embodiment of this application provides a device for audio signal coding, for example, an audio coding apparatus. As shown in FIG. 9, an audio coding apparatus 900 includes a processor 901, a memory 902, and a communication interface 903 (there may be one or more processors 901 in the audio coding apparatus 900, and FIG. 9 uses an example with one processor). In some embodiments of this application, the processor 901, the memory 902, and the communication interface 903 may be connected through a bus or in another manner. FIG. 9 shows an example of connection through a bus.

The memory 902 may include a ROM and a RAM, and provides an instruction and data for the processor 901. A part of the memory 902 may further include a non-volatile RAM (NVRAM). The memory 902 stores an operating system and operation instructions, an executable module or a data structure, or a subset thereof or an extended set thereof. The operation instructions may include various operation instructions for implementing various operations. The operating system may include various system programs, to implement various basic services and process a hardware-based task.

The processor 901 controls an operation of the audio coding device, and the processor 901 may also be referred to as a central processing unit (CPU). In specific application, components of the audio coding device are coupled together by using a bus system. In addition to a data bus, the bus system may further include a power bus, a control bus, a status signal bus, and the like. However, for clear description, various types of buses in the figure are marked as the bus system.

The method disclosed in the foregoing embodiments of this application may be applied to the processor 901 or may be implemented by the processor 901. The processor 901 may be an integrated circuit chip and has a signal processing capability. In an implementation process, steps in the foregoing methods can be implemented by using a hardware integrated logical circuit in the processor 901, or by using instructions in a form of software. The processor 901 may be a general-purpose processor, a DSP, an ASIC, an FPGA or another programmable logic device, a discrete gate or transistor logic device, or a discrete hardware component. It may implement or perform the methods, the steps, and logical block diagrams that are disclosed in embodiments of this application. The general-purpose processor may be a microprocessor, any conventional processor, or the like. Steps of the methods disclosed with reference to embodiments of this application may be directly executed and accomplished through a hardware decoding processor, or may be executed and accomplished by using a combination of hardware and software modules in the decoding processor. The software module may be located in a mature storage medium in the art, such as a RAM, a flash memory, a ROM, a programmable ROM, an electrically erasable programmable memory, or a register. The storage medium is located in the memory 902, and the processor 901 reads information in the memory 902 and completes the steps in the foregoing methods in combination with hardware of the processor 901.

The communication interface 903 may be configured to receive or send digit or character information, for example, may be an input/output interface, a pin, or a circuit. For example, the foregoing coded bitstream is sent through the communication interface 903.

Based on a same concept as the foregoing method, an embodiment of this application provides an audio coding device, including a non-volatile memory and a processor that are coupled to each other. The processor invokes program code stored in the memory to perform a part or all of the steps of the audio signal coding method in the foregoing one or more embodiments.

Based on a same concept as the foregoing method, an embodiment of this application provides a computer-readable storage medium. The computer-readable storage medium stores program code, and the program code includes instructions for performing a part or all of the steps of the audio signal coding method in the foregoing one or more embodiments.

Based on a same concept as the foregoing method, an embodiment of this application provides a computer program product. When the computer program product runs on a computer, the computer is enabled to perform a part or all of the steps of the audio signal coding method in the foregoing one or more embodiments.

The processor mentioned in the foregoing embodiments may be an integrated circuit chip, and has a signal processing capability. In an implementation process, steps in the foregoing method embodiments can be implemented by using a hardware integrated logical circuit in the processor, or by using instructions in a form of software. The processor may be a general-purpose processor, a DSP, an ASIC, an FPGA or another programmable logic device, a discrete gate or transistor logic device, or a discrete hardware component. The general-purpose processor may be a microprocessor, any conventional processor, or the like. The steps of the methods disclosed in embodiments of this application may be directly executed and accomplished through a hardware coding processor, or may be executed and accomplished by using a combination of hardware and software modules in the coding processor. The software module may be located in a mature storage medium in the art, for example, a RAM, a flash memory, a ROM, a programmable ROM, an EEPROM, or a register. The storage medium is located in the memory, and the processor reads information in the memory and completes the steps in the foregoing methods in combination with hardware of the processor.

The memory in the foregoing embodiments may be a volatile memory or a non-volatile memory, or may include both a volatile memory and a non-volatile memory. The non-volatile memory may be a ROM, a programmable ROM (PROM), an erasable programmable ROM (EPROM), an EEPROM, or a flash memory. The volatile memory may be a RAM, used as an external cache. By way of example but not limitative description, many forms of RAMs are available, for example, a static RAM (SRAM), a dynamic RAM (DRAM), a synchronous DRAM (SDRAM), a double data rate (DDR) SDRAM, an enhanced SDRAM (ESDRAM), a synchlink DRAM (SLDRAM), and a direct rambus (DR) RAM. It should be noted that the memory of the systems and methods described in this specification includes but is not limited to these and any memory of another proper type.

A person of ordinary skill in the art may be aware that, in combination with units and algorithm steps in the examples described in embodiments disclosed in this specification, this application can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. A part or all of the units may be selected according to actual requirements to achieve the objectives of the solutions of the embodiments.

In addition, functional units in embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions in this application essentially, or the part contributing to the conventional technology, or a part of the technical solutions may be implemented in a form of a software product. The computer software product is stored in a storage medium and includes several instructions for instructing a computer device (a personal computer, a server, a network device, or the like) to perform all or a part of the steps of the methods in embodiments of this application. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An audio coding method comprising:

obtaining a current frame of an audio signal, wherein the current frame comprises a first high-frequency band signal and a low-frequency band signal;

performing bandwidth extension coding on the first high-frequency band signal and the low-frequency band signal to obtain a first coding parameter of the current frame;

determining a spectrum reservation flag of each frequency bin of the first high-frequency band signal, wherein the spectrum reservation flag indicates whether a first spectrum corresponding to a corresponding frequency bin is reserved in a second spectrum corresponding to the corresponding frequency bin, wherein the first spectrum corresponds to the corresponding frequency bin before the bandwidth extension coding, and wherein the second spectrum corresponds to the corresponding frequency bin after the bandwidth extension coding;

performing a second coding on the first high-frequency band signal based on the spectrum reservation flag to obtain a second coding parameter of the current frame, wherein the second coding parameter indicates first information about a target tonal component of the first high-frequency band signal, and wherein the first information comprises first location information of the target tonal component, first quantity information of the target tonal component, and either first amplitude information of the target tonal component or first energy information of the target tonal component; and performing bitstream multiplexing on the first coding parameter and the second coding parameter to obtain a coded bitstream.

2. The audio coding method of claim 1, further comprising further determining the spectrum reservation flag based on the first spectrum, the second spectrum, and a frequency range of the bandwidth extension coding.

3. The audio coding method of claim 2, wherein a high-frequency band corresponding to the first high-frequency band signal comprises at least one frequency area, wherein the at least one frequency area comprises a current frequency area, and wherein:

a first value of a second spectrum reservation flag of a first frequency bin in the current frequency area comprises a first preset value when the first frequency bin does not belong to the frequency range; and when a second frequency bin in the current frequency area belongs to the frequency range:

a second value of a third spectrum reservation flag of the second frequency bin comprises a second preset value when a first spectrum value corresponding to the second frequency bin before the bandwidth extension coding and a second spectrum value corresponding to the second frequency bin after the bandwidth extension coding meet a preset condition; and the second value comprises a third preset value when the first spectrum value and the second spectrum value do not meet the preset condition.

4. The audio coding method of claim 3, wherein the preset condition comprises that a third spectrum value corresponding to a third frequency bin before the bandwidth extension coding is equal to a fourth spectrum value corresponding to the third frequency bin after the bandwidth extension coding.

5. The audio coding method of claim 1, wherein a high-frequency band corresponding to the first high-frequency band signal comprises at least one frequency area, wherein the at least one frequency area comprises a current frequency area, and wherein the audio coding method further comprises:

performing a peak search based on a second high-frequency band signal of the current frequency area to obtain second information about a peak in the current frequency area, wherein the second information comprises second quantity information of the peak, second location information of the peak, and second amplitude information of the peak or second energy information of the peak;

performing peak screening on the second information based on the spectrum reservation flag to obtain third information about a candidate tonal component of the current frequency area;

obtaining fourth information about a second target tonal component of the current frequency area based on the third information; and obtaining the second coding parameter based on the fourth information.

6. The audio coding method of claim 5, wherein the current frequency area comprises at least one subband, and wherein the audio coding method further comprises:

obtaining a second spectrum reservation flag of each of the at least one subband based on the spectrum reservation flag; and further performing the peak screening on the second information based on the second spectrum reservation flag to obtain the third information.

7. The audio coding method of claim 6, further comprising:

obtaining, based on the second location information, a subband sequence number corresponding to a location of the peak; and further performing the peak screening on the second information based on the subband sequence number to obtain the third information.

8. The audio coding method of claim 6, wherein the at least one subband comprises a current subband, and wherein the audio coding method further comprises:

determining that a first value of a third spectrum reservation flag of the current subband is a first flag value when a quantity of frequency bins that are in the current subband and comprise values of spectrum reservation flags that are equal to a second preset value is greater than a preset threshold, wherein a second value of a fourth spectrum reservation flag of a frequency bin is the second preset value when a first spectrum value corresponding to the frequency bin before the bandwidth extension coding and a second spectrum value corresponding to the frequency bin after the bandwidth extension coding meet a preset condition; and determining that the first value is a second flag value when the quantity of the frequency bins is less than or equal to the preset threshold.

9. The audio coding method of claim 8, wherein the first value is the second flag value, and wherein a second peak in the current subband is a second candidate tonal component.

10. An audio coding apparatus comprising:

a memory configured to store instructions; and a processor coupled to the memory and configured to execute the instructions to cause the audio coding apparatus to:

obtain a current frame of an audio signal, wherein the current frame comprises a first high-frequency band signal and a low-frequency band signal;

perform bandwidth extension coding on the first high-frequency band signal and the low-frequency band signal to obtain a first coding parameter of the current frame;

determine a spectrum reservation flag of each frequency bin of the first high-frequency band signal, wherein the spectrum reservation flag indicates whether a first spectrum corresponding to a corresponding frequency bin is reserved in a second spectrum corresponding to the corresponding frequency bin, wherein the first spectrum corresponds to the corresponding frequency bin before the bandwidth extension coding, and wherein the second spectrum corresponds to the corresponding frequency bin after the bandwidth extension coding;

perform a second coding on the first high-frequency band signal based on the spectrum reservation flag to obtain a second coding parameter of the current frame, wherein the second coding parameter indicates first information about a target tonal component of the first high-frequency band signal, and wherein the first information comprises first location information of the target tonal component, first quantity information of the target tonal component, and first amplitude information of the target tonal component or first energy information of the target tonal component; and perform bitstream multiplexing on the first coding parameter and the second coding parameter to obtain a coded bitstream.

11. The audio coding apparatus of claim 10, wherein the processor is further configured to execute the instructions to cause the audio coding apparatus to further determine the spectrum reservation flag based on the first spectrum, the second spectrum, and a frequency range of the bandwidth extension coding.

12. The audio coding apparatus of claim 11, wherein a high-frequency band corresponding to the first high-frequency band signal comprises at least one frequency area, wherein the at least one frequency area comprises a current frequency area, and wherein:

a first value of a second spectrum reservation flag of a first frequency bin in the current frequency area comprises a first preset value when the first frequency bin does not belong to the frequency range; and when a second frequency bin in the current frequency area belongs to the frequency range:

a second value of a third spectrum reservation flag of the second frequency bin comprises a second preset value when a first spectrum value corresponding to the second frequency bin before the bandwidth extension coding and a second spectrum value corresponding to the second frequency bin after the bandwidth extension coding meet a preset condition; and the second value comprises a third preset value when the first spectrum value and the second spectrum value do not meet the preset condition.

13. The audio coding apparatus of claim 12, wherein the preset condition comprises that a third spectrum value corresponding to a third frequency bin before the bandwidth extension coding is equal to a fourth spectrum value corresponding to the third frequency bin after the bandwidth extension coding.

14. The audio coding apparatus of claim 10, wherein a high frequency band corresponding to the first high-frequency band signal comprises at least one frequency area, wherein the at least one frequency area comprises a current frequency area, and wherein the processor is further configured to execute the instructions to cause the audio coding apparatus to:

perform a peak search based on a second high-frequency band signal of the current frequency area to obtain second information about a peak in the current frequency area, wherein the second information comprises second quantity information of the peak, second location information of the peak, and second amplitude information of the peak or second energy information of the peak;

perform peak screening on the second information based on the spectrum reservation flag to obtain third information about a candidate tonal component of the current frequency area;

obtain fourth information about a second target tonal component of the current frequency area based on the third information; and obtain the second coding parameter based on the fourth information.

15. The audio coding apparatus of claim 14, wherein the current frequency area comprises at least one subband, and wherein the processor is further configured to execute the instructions to cause the audio coding apparatus to:

obtain a second spectrum reservation flag of each of the at least one subband based on the spectrum reservation flag; and further perform the peak screening on the second information based on the second spectrum reservation flag to obtain the third information.

16. The audio coding apparatus of claim 15, wherein the at least one subband comprises a current subband, and wherein the processor is further configured to execute the instructions to cause the audio coding apparatus to:

determine that a first value of a third spectrum reservation flag of the current subband is a first flag value when a quantity of frequency bins that are in the current subband and comprise values of spectrum reservation flags that are equal to a second preset value is greater than a preset threshold, wherein a second value of a fourth spectrum reservation flag of a frequency bin is the second preset value when a first spectrum value corresponding to the frequency bin before the bandwidth extension coding and a second spectrum value corresponding to the frequency bin after the bandwidth extension coding meet a preset condition; and determine that the first value is a second flag value when the quantity of the frequency bins is less than or equal to the preset threshold.

17. The audio coding apparatus of claim 16, wherein the first value is the second flag value, and wherein a second peak in the current subband is a second candidate tonal component.

18. The audio coding apparatus of claim 15, wherein the processor is further configured to execute the instructions to cause the audio coding apparatus to:

obtain, based on the second location information, a subband sequence number corresponding to a location of the peak; and further perform the peak screening on the second information based on the subband sequence number to obtain the third information.

19. A computer program product comprising computer-executable instructions that are stored on a non-transitory computer-readable storage medium and that, when executed by a processor, cause an audio coding apparatus to:

obtain a current frame of an audio signal, wherein the current frame comprises a first high-frequency band signal and a low-frequency band signal;

perform bandwidth extension coding on the first high-frequency band signal and the low-frequency band signal to obtain a first coding parameter of the current frame;

determine a spectrum reservation flag of each frequency bin of the first high-frequency band signal, wherein the spectrum reservation flag indicates whether a first spectrum corresponding to a corresponding frequency bin is reserved in a second spectrum corresponding to the corresponding frequency bin, wherein the first spectrum corresponds to the corresponding frequency bin before the bandwidth extension coding, and wherein the second spectrum corresponds to the corresponding frequency bin after the bandwidth extension coding;

perform a second coding on the first high-frequency band signal based on the spectrum reservation flag to obtain a second coding parameter of the current frame, wherein the second coding parameter indicates first information about a target tonal component of the first high-frequency band signal, and wherein the first information comprises first location information of the target tonal component, first quantity information of the target tonal component, and first amplitude information of the target tonal component or first energy information of the target tonal component; and perform bitstream multiplexing on the first coding parameter and the second coding parameter to obtain a coded bitstream.

20. The computer program product of claim 19, wherein the computer-executable instructions further cause the audio coding apparatus to further determine the spectrum reservation flag based on the first spectrum, the second spectrum, and a frequency range of the bandwidth extension coding.

* * * * *